(12) United States Patent
Payandeh et al.

(10) Patent No.: US 8,217,932 B2
(45) Date of Patent: Jul. 10, 2012

(54) SYSTEMS AND METHODS FOR IMPLEMENTING HAPTIC SYSTEMS AND STIMULATED ENVIRONMENTS

(75) Inventors: Shahram Payandeh, Coquitlam (CA); John Cedric Dill, Vancouver (CA)

(73) Assignee: Simon Fraser University, Burnaby (CA)

( * ) Notice: Subject to any disclaimer, the term of this patent is extended or adjusted under 35 U.S.C. 154(b) by 1069 days.

(21) Appl. No.: 12/118,395

(22) Filed: May 9, 2008

(65) Prior Publication Data

US 2008/0278484 A1 Nov. 13, 2008

Related U.S. Application Data

(60) Provisional application No. 60/917,308, filed on May 10, 2007.

(51) Int. Cl.
*G06T 15/00* (2006.01)
(52) U.S. Cl. ........................ 345/419; 715/701
(58) Field of Classification Search .................. 345/419; 715/701
See application file for complete search history.

(56) References Cited

U.S. PATENT DOCUMENTS 6,714,901 B1 * 3/2004 Cotin et al. ........................ 703/7

OTHER PUBLICATIONS

Payandeh et al. "A Study of Level-of-Detail in Haptic Rendering" ACM Transactions on Applied Perceptions, vol. 2. No. 1, Jan. 2005, pp. 15-28.*
Zhang et al. "Haptic Subdivision: an Approach to Defining Level-of-detail in Haptic Rendering", Haptic Interfaces for Virtual Environment and Teleoperator Systems, 2002, pp. 1-5.*
McDonnell et al. "Virtual Clay: A Real-time Sculpting System with Haptic Toolkits", Proceedings of the 2001 symposium on Interactive 3D Graphics, ACM, 2001, p. 6.*
Bruyns et al. "A survey of interactive mesh-cutting techniques and a new method for implementing generalized interactive mesh cutting using virtual tools", The Journal of Visualization and Computer Animation, 2002, pp. 22-23, 33.*
Payandeh et al. "Demo: A Multi-Modal Training Environment for Surgeons" ICMI 03', Nov. 2003, pp. 301-302.*

* cited by examiner

*Primary Examiner* — Maurice L McDowell, Jr.
(74) *Attorney, Agent, or Firm* — Oyen Wiggs Green & Mutala LLP

(57) ABSTRACT

A method is provided for simulating interaction between a tool and an object. The method involves: providing a tool model for simulating the tool in a simulated environment; providing a mesh for simulating the object in the simulated environment, the mesh comprising a plurality of nodes and a plurality of first force functions between pairs of nodes, each first force function being a function of a distance between its corresponding pair of nodes; and deforming the mesh in response to interaction between the tool model and the mesh in the simulated environment. Deforming the mesh may involve: displacing one or more initially displaced nodes; and displacing one or more level-one-connected nodes, displacement of each level-one-connected node dependent on at least one first force function between the level-one-connected node and a corresponding one of the one or more initially displaced nodes.

68 Claims, 17 Drawing Sheets

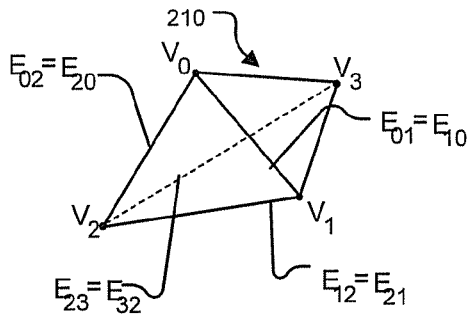
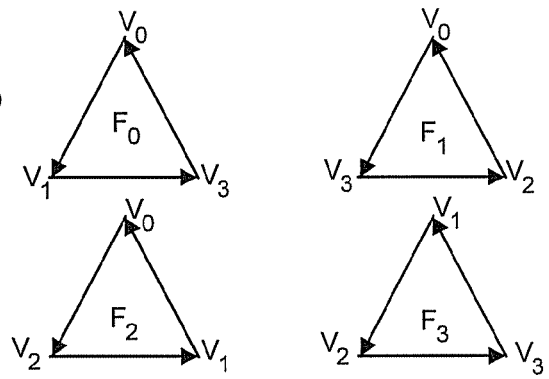
FIGURE 3A
FIGURE 3B
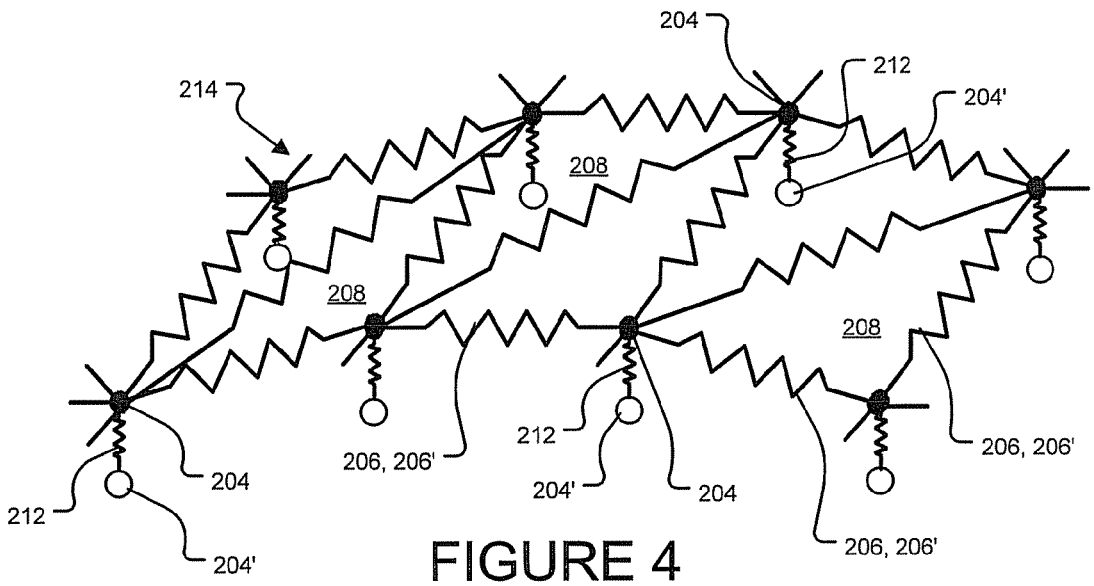
FIGURE 4
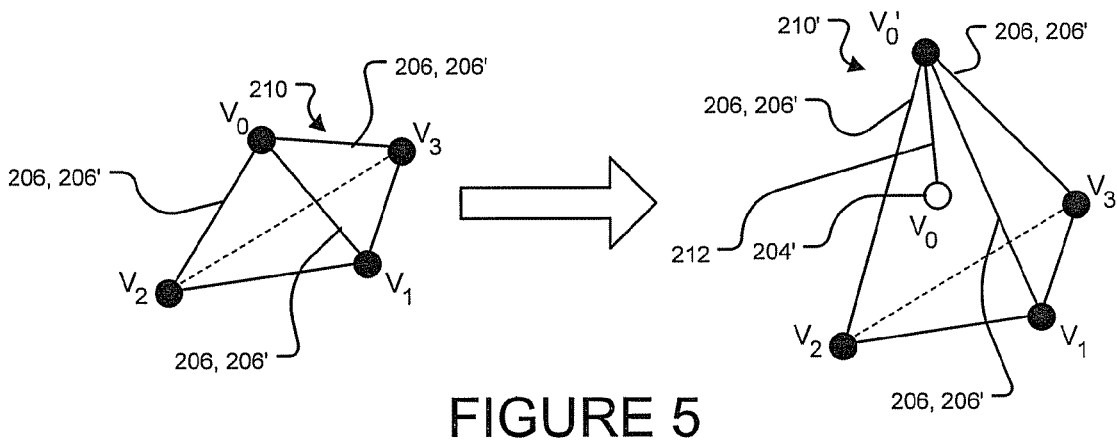
FIGURE 5

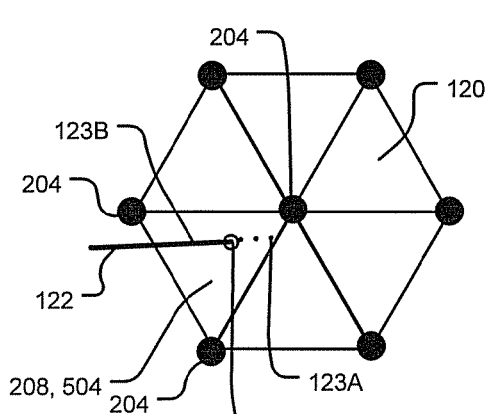
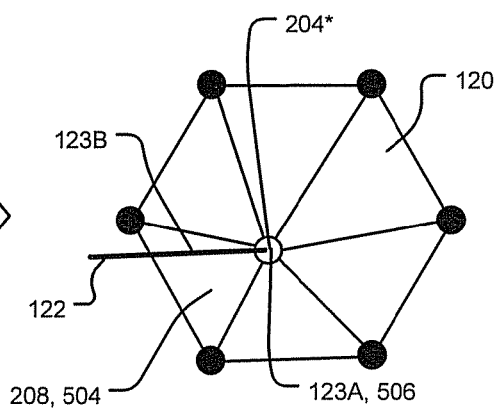
FIGURE 14A  FIGURE 14B
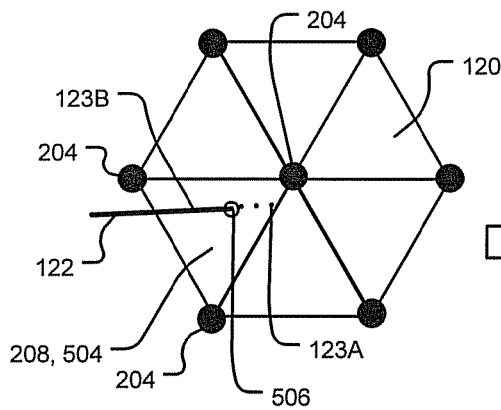
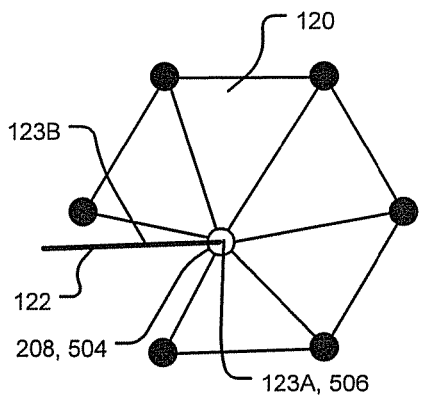
FIGURE 15A  FIGURE 15B
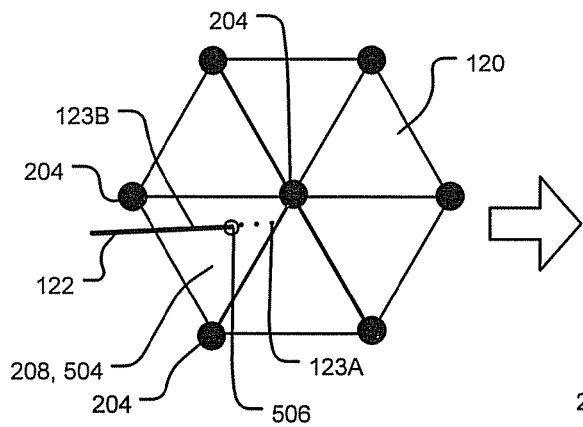
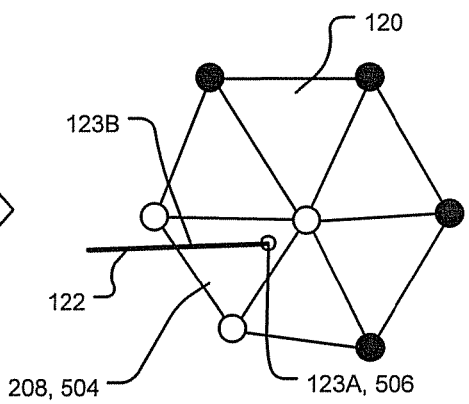
FIGURE 16A  FIGURE 16B

SYSTEMS AND METHODS FOR IMPLEMENTING HAPTIC SYSTEMS AND STIMULATED ENVIRONMENTS

RELATED APPLICATIONS

This application claims the benefit of the priority of U.S. application No. 60/917,308 filed 10 May 2007 which is hereby incorporated herein by reference.

TECHNICAL FIELD

The invention disclosed herein relates to simulation of operational environments for various types of user-operable devices. Particular embodiments provide systems and methods for implementing such devices and for training operators of such devices.

BACKGROUND

There is a general desire to provide human users (operators) with apparatus and corresponding environments for practicing the operation of various equipment, devices and/or tools. Such apparatus and environments may be used for initial training (i.e. prior to the use of such equipment, devices and/or tools for real life applications) and/or ongoing training purposes. By way of non-limiting example, such equipment, devices and/or tools may include industrial equipment, personal devices and/or medical tools. A flight simulation system represents an example of an apparatus and environment which may be used for flight training prior to flying an actual aircraft.

When operating many types of equipment, devices and/or tools, operators interact with the equipment, devices and/or tools using, at least in part, their sense of touch. For example, an operator of a pair of scissors can tell when they are cutting through an object by sensing the resistance to closure of the scissors' handles. In general, when an object is more difficult to cut, there is greater resistance to the closure fo the scissors' handles. A haptic device/system is a type of device/system which interfaces with one or more users, at least in part, via the sense of touch. For example, haptic devices/systems may generate forces, vibrations, motions or the like that may be experienced by an operator of such devices/systems.

A number of haptic systems are in use today. One example of a haptic system in use today is deployed in the navigation systems of large aircraft. In most smaller or older aircraft, there is a direct operational linkage between the aircraft "control stick" (i.e. the user interface) and the "control surfaces" used to manipulate the aircraft's orientation in the sky (e.g. ailerons on the wings and rudders and elevators on the tail). When such an aircraft is flown in a manner approaches a stall condition, aerodynamic buffeting is transferred from the control surfaces, over the operational linkage and to the control stick. This tactile feedback is sensed by the pilot and provides a useful warning to the pilot of dangerous flight conditions. In newer and/or larger planes, however, the operational linkages between the control sticks and the aircrafts' control surfaces have been replaced by electronically controlled servo systems. In aircraft having such servo systems, aerodynamic forces are not transferred from the control surfaces back to the control stick over an operational linkage. Consequently, there is no "natural" tactile indicator of dangerous flight conditions that may be experienced by the pilot on the control stick. In some aircraft, the indicator of dangerous flight conditions has been replaced by a haptic system which monitors the aircraft angle of attack (and possibly other parameters) and, upon approaching a critical stall condition, causes the control stick to shake and to thereby alert the pilot of dangerous flying conditions.

Haptic devices/systems are either being used or envisaged as being useful in a large number and a wide variety of fields. Examples of such fields include, without limitation, electronic gaming, industrial applications, medical applications, robotics and virtual reality applications. By way of non-limiting example, it is envisaged that a number of medical procedures, such as laparoscopy, interventional radiology and the like, could be performed by a medical practitioner operating the interface of a haptic system at a centralized workstation, where the haptic system enables the practitioner to operate tools that perform medical procedures at remote locations.

In many applications, such as industrial and medical applications in particular, it is desirable to provide operators of haptic devices with training before using the haptic devices in real applications. By way of example, for the medical haptic systems discussed above, there is a general desire that the medical practitioner receive training using the haptic systems in a simulated environment, wherein the simulated environment provides haptic feedback that is similar to that which would be experienced when performing an actual medical procedure on a patient. Similarly, for haptic systems used in industrial applications, it is desirable in some instances for device operators to practice using the system in a simulated environment wherein the simulated environment provides haptic feedback that is similar to that which would be experienced when operating the actual device.

There is a general desire to provide methods and apparatus for implementing such haptic simulators and for training the operators of various types of equipment, devices and/or tools.

Other aspects of the invention are set out in the description and drawings provided herewith.

BRIEF DESCRIPTION OF THE DRAWINGS

In drawings which depict non-limiting embodiments of the invention:

FIG. 3A depicts a simulated tetrahedron for the purpose of describing a data structure suitable for maintaining the FIG. 2 mesh;

FIG. 3B depicts the faces of the FIG. 3A tetrahedron;

FIG. 4 schematically depicts a spring-based mesh which may be used to simulate an environment for operation of the FIG. 1 device in accordance with another embodiment of the invention;

FIG. 5 shows an example of deformation of a simulated tetrahedron for the purposes of describing the effect of deformation of simulated objects in the FIG. 4 mesh;

FIGS. 14A and 14B schematically depict a sticky node technique for modeling a contact event;

FIGS. 15A and 15B schematically depict a shrink face technique for modeling a contact event;

FIGS. 16A and 16B schematically depicts a push face technique for modeling a contact event;

DETAILED DESCRIPTION

Throughout the following description, specific details are set forth in order to provide a more thorough understanding of the invention. However, the invention may be practised without these particulars. In other instances, well known elements have not been shown or described in detail to avoid unnecessarily obscuring the invention. Accordingly, the specification and drawings are to be regarded in an illustrative, rather than a restrictive, sense.

One particular embodiment of the invention provides a method for simulating interaction between a tool and an object. The method involves: providing a tool model for simulating the tool in a simulated environment; providing a mesh for simulating the object in the simulated environment, the mesh comprising a plurality of nodes and a plurality of first force functions between pairs of nodes, each first force function being a function of a distance between its corresponding pair of nodes; and deforming the mesh in response to interaction between the tool model and the mesh in the simulated environment. Deforming the mesh may involve: displacing one or more initially displaced nodes; and displacing one or more level-one-connected nodes, displacement of each level-one-connected node dependent on at least one first force function between the level-one-connected node and a corresponding one of the one or more initially displaced nodes.

Figure 1A:
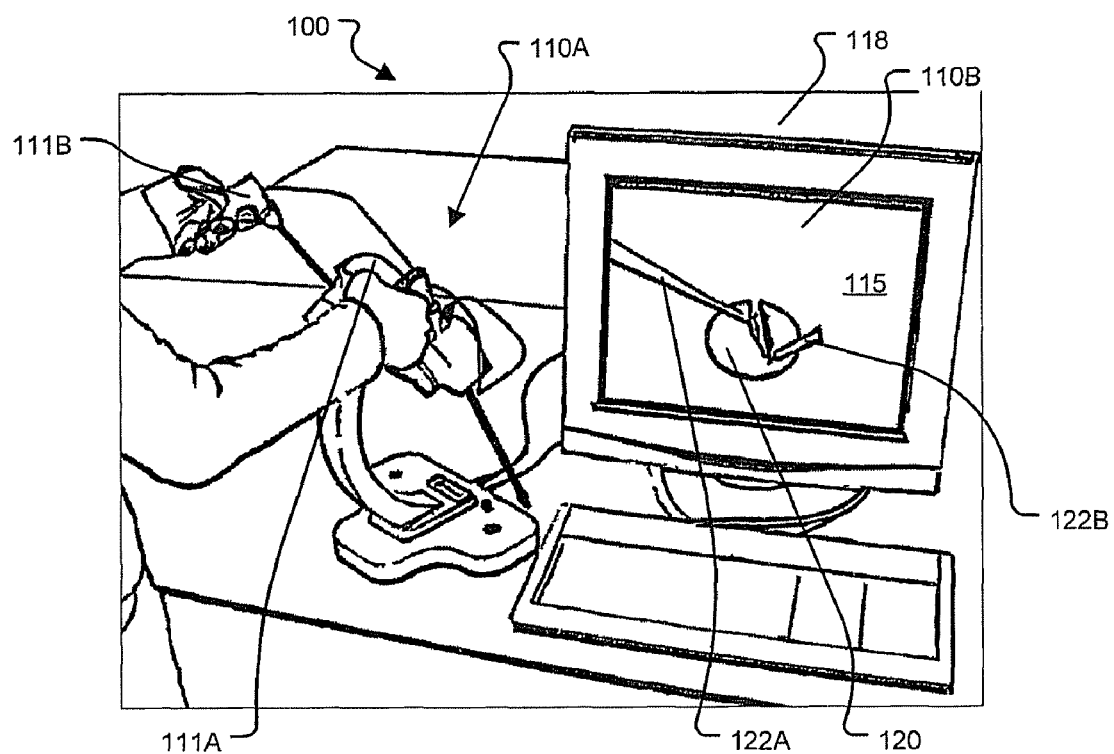
FIG. 1A shows a haptic operator-training device according to a particular embodiment of the invention.

FIG. 1A shows a haptic operator-training device 100 according to a particular embodiment of the invention. Device 100 is also represented schematically in FIG. 1B. Device 100 comprises a user interface 110. In the illustrated embodiment, device 100 comprises a haptic user interface 110A and a visual (e.g. graphical) user interface 110B. Haptic user interface 110A generally comprises an interface that allows an operator to interact with device 100 using, at least in part, the operator's sense of touch (i.e. tactile interaction).

Operator-training device 100 may provide an environment for training the operator of particular tool(s), equipment and/or device(s). For the purposes of explanation only, it is assumed for that operator-training device 100 is used to train operators of a particular pair of tools. As such, haptic user interface 110A incorporates a pair of haptic interface components 111A, 111B (collectively, 111) similar to those of the particular pair of tools. For example, haptic interface components 111 may be shaped like and/or made out of materials similar to the user interface of the particular pair of tools. In the illustrated embodiment of FIG. 1A, device 100 provides an environment for training the operator of surgical tools. More particularly, the illustrated device 100 provides an environment for simulating the use of a surgical grasping device and a surgical cauterizing device. Accordingly, in the illustrated embodiment, haptic user interface 110A comprises haptic interface components 111A and 11B which are similar to the handles of a surgical grasping device and a surgical cauterizing device.

In general, device 100 may be used to train the operators of other tools, equipment or devices. For example, device 100 may be used to train the operator of an aircraft, in which case, haptic user interface 110A may comprise haptic interface components 111 that resemble one or more of the cockpit controls of the aircraft, or device 100 may be used to train the operator of a remote control grasping machine, in which case, haptic user interface 110A may comprise haptic interface components 111 that resemble the user interface of the remote control grasping machine.

Figure 1B:
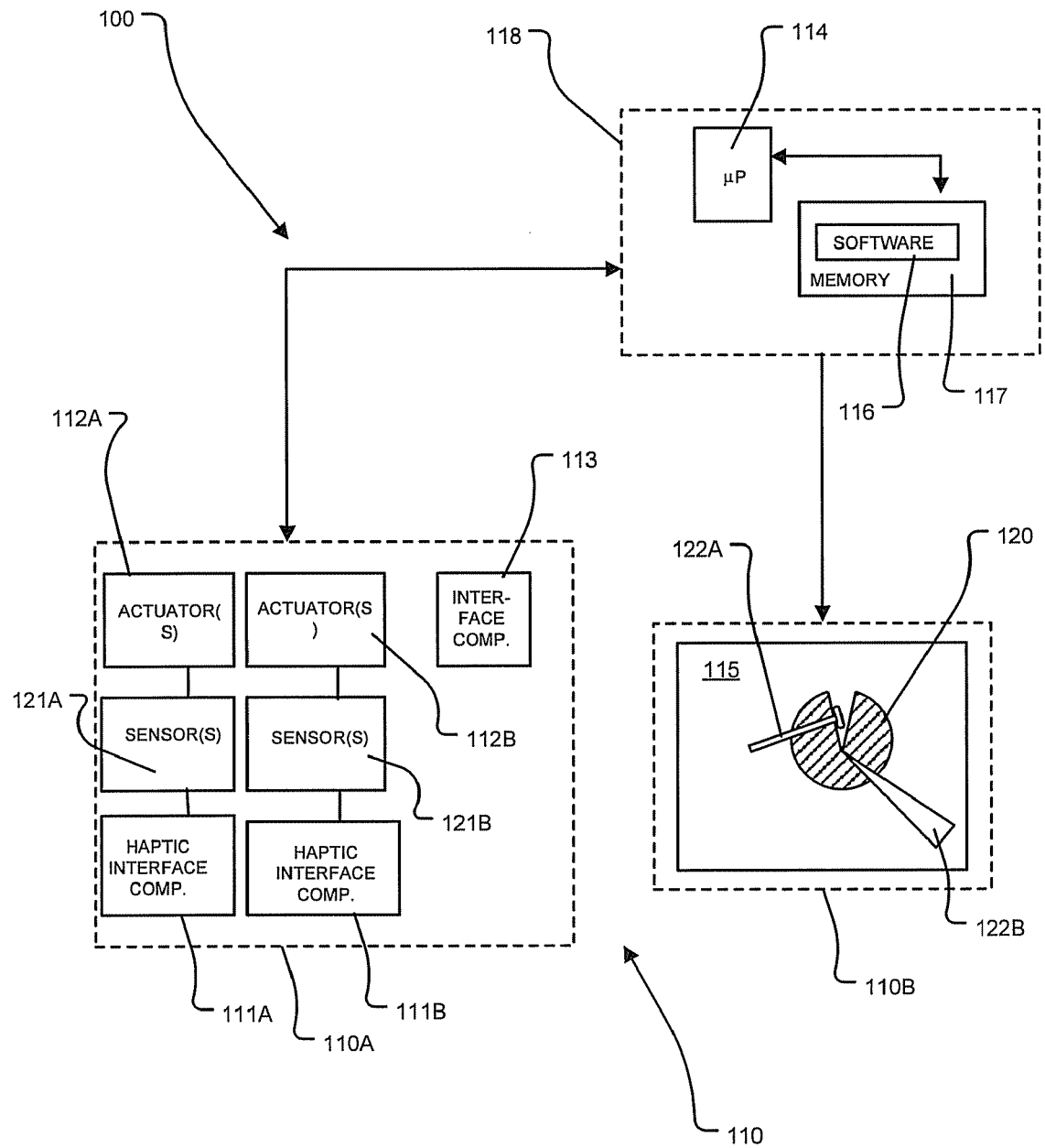
FIG. 1B is a schematic representation of the FIG. 1A haptic operator-training device.

In the illustrated embodiment of FIGS. 1A and 1B, haptic user interface 110A comprises two haptic interface components 111 corresponding to two surgical tools. This is not necessary. In general, haptic user interface 110A may comprise any suitable number of haptic interface components 111. As shown in FIG. 1B, haptic user interface 110A may also comprise one or more non-haptic interface components 113. Such non-haptic interface components 113 may generally include any suitable input and/or output device, such as, buttons, switches, pointing devices (e.g. computer mouse) and displays, for example. In some embodiments, non-haptic interface components 113 may be located separately from haptic user interface 110A.

Haptic user interface 110A comprises one or more haptic actuators 112A, 112B (collectively, 112) which may be actuated in response to signals (referred to as "haptic feedback signals") from control unit 118 to provide tactile feedback to the operator of device 100. By way of non-limiting example, actuators 112 may comprise one or more electric motors or pneumatic actuators coupled to haptic interface components 111 by suitable mechanical linkages (e.g. gears, pulleys, pivot joints or the like). Actuators 112 and their corresponding linkages may allow a user to manipulate and/or operate haptic interface components 111 in a realistic manner. In particular embodiments, actuator(s) 112 are connected to move and/or to resist movement of corresponding haptic interface components 111 and to thereby imitate the interface of the tool, equipment and/or device on which operators are being trained. For example, device 100 may be used to train the operator of an aircraft, in which case, haptic user interface 110A may comprise one or more actuators 112 coupled to move and/or to resist movement of a haptic interface component 111 similar to that of an aircraft control stick. A particular, non-limiting example of actuators 112 coupled to a haptic interface component 111 for a medical manipulator device is shown in U.S. Pat. No. 6,219,589 which is hereby incorporated herein by reference. In general, haptic user interface 110A may comprise any suitable actuator(s) 112 and may be directly coupled to haptic interface components 111 or coupled to haptic interface components 111 using any suitable mechanical linkage. In some embodiments, actuator(s) 112 may be replaced or accompanied by resistance generating devices (e.g. clutches, braking systems or the like) which provide resistance to movement.

In the illustrated embodiment of FIG. 1B, haptic user interface 110A is shown as having a pair of actuators 112A, 112B, each of which corresponds to a haptic interface component 111A, 111B. This is not necessary. In general, haptic user interface 110A may comprise any suitable number of actuators 112 and there may be one or more actuators 112 coupled to move and/or to resist movement of each haptic interface component 111. It is assumed, in the description presented herein that each actuator 112 schematically depicted in FIG. 1B actually comprises a plurality of individually controllable actuators 112. Haptic user interface 110A may also comprise one or more actuators 112 which are coupled to move and/or resist movement of multiple haptic interface components 111.

As mentioned above, operator-training device 100 also comprises a visual user interface 110B which provides visual feedback to the operator. In some embodiments, visual user interface 110B may be supplemented and/or replaced by user interface components (not shown) which interact with the other senses of the operator (e.g. audio senses, olfactory senses or the like). In general, it is not necessary that haptic user interface 110A, visual user interface 110B or the interfaces relating to other operator senses be distinct from one another. Device 100 may comprise one or more user interfaces that interact with the operator using a variety of sensory stimuli.

Haptic operator-training device 100 provides a simulated operational environment (not explicitly shown in FIGS. 1A and 1B). This simulated environment is maintained by a control unit 118. In general, control unit 118 may comprise or may otherwise be embodied by a wide variety of components. For example, control unit 118 may comprise one or more programmable processor(s) which may include, without limitation, embedded microprocessors, dedicated computers, groups of data processors or the like. Some functions of control unit 118 may be implemented in software, while others may be implemented with specific hardware devices. The operation of control unit 118 may be governed by appropriate firmware/code residing and executing therein, as is well known in the art. Control unit 118 may comprise memory or have access to external memory. In the illustrated embodiment of FIG. 1B, control unit 118 comprises one or more processor(s) 114 which execute suitably programmed software 116 and have access to memory 117.

In the FIG. 1A embodiment, control unit 118 is embodied by a computer, although this is not necessary, as control unit 118 may be implemented in an embedded architecture or some other control unit 118 specific to device 100. As is known to those skilled in the art, control unit 118 may comprise or may otherwise be connected to other interface components (not specifically shown) which may be used to interact with haptic user interface 110A and/or visual user interface 110B. By way of non-limiting example, such interface components may comprise controllable driver circuits for driving actuators 112 in response to signals from processor(s) 114 and/or signal processing circuits for receiving sensor signals from sensors 121 (discussed further below) and for converting such sensor signals to a digital format or for otherwise processing such sensor signals into a format suitable for interpretation by processor(s) 114.

In the illustrated embodiment, the simulated environment maintained by control unit 118 is experienced by the operator as a visual representation 115 on visual user interface 110B and as movement and/or resistance to movement of haptic interface components 111. Such movement and/or resistance to movement of haptic interface components 111 is effected by the actuators 112 of haptic user interface 110A. The simulated environment typically contains one or more simulated objects 120 and one or more simulated parts of the tools, equipment and/or devices 122 on which operators are being trained. Simulated parts of tools, equipment and/or devices 122 are referred to herein, without loss of generality, as "simulated tool component(s)" 122. Simulated objects 120 and simulated tool components 122 may be shown in visual representation 115 on visual user interface 110B. For example, in FIG. 1A, visual representation 115 of the simulated environment depicts simulated tool components 122A and 122B and a disk-shaped object 120. In the illustrated embodiment, tool component 122A is a grasping device and tool component 122B is a cauterizing device (used, in the illustrated embodiment, for cutting simulated object 120). In another embodiment, where device 100 is used to train pilots, simulated object(s) 120 may include the earth and its varying surface, clouds etc. and tool components 122 may include parts of an aircraft (e.g. the landing gear, the ailerons, the nose of the aircraft, etc.) simulated by user interface 110.

Haptic user interface 110A also comprises one or more sensors 121A, 121B (collectively, sensors 121). Sensors 121 are configured to detect one or more characteristics of haptic interface components 111. By way of non-limiting example, sensors 121 may be configured to detect the positions and/or orientations of haptic interface components 111 and/or the force being applied by an operator to haptic interface components 111. Position and/or orientation sensors 121 may be embodied by encoders coupled to pivot joints and/or to actuators 112, for example. Encoders and other suitably configured position and/or orientation sensors 121 may be used to implement haptic device 100 (at least in part) according to the so-called "mechanical impedance model". Force sensors 121 may be embodied by suitably configured accelerometers, for example. Force sensors 121 may be used to implement haptic device 100 (at least in part) according to the so-called "admittance model". For simplicity, in the schematic drawing of FIG. 1B, each haptic interface component 111 is shown as having one corresponding sensor 121. This is not necessary. In general, each haptic interface component 111 may be associated with any suitable number of sensors 121. It is assumed, in the description presented below that each sensor 121 schematically depicted in FIG. 1B actually comprises a plurality of individual sensors 121. Haptic user interface 110A may also comprise one or more sensors which are associated with more than one haptic interface component 111.

Simulated tool components 122 may be manipulated within the simulated environment by operator manipulation of haptic interface components 111. When haptic interface components 111 are manipulated by an operator, these manipulations are detected by corresponding sensors 121 and the information detected by sensors 111 is provided to control unit 118 as sensor signals. Control unit 118 then uses these sensor signals to update the characteristics of the simulated tool components 122 within the simulated environment. In the illustrated embodiment of FIG. 1B, control unit 118 maintains two simulated tool components 122A, 122B in the simulated environment and there is a correspondence between haptic interface component 111A and simulated tool component 122A and between haptic interface component 111B and simulated tool component 122B. Accordingly, when an operator manipulates haptic interface component 111A, such manipulation is detected by sensors 121A and, in response to sensor signal information from sensors 121A, control unit 118 updates the characteristics of simulated tool component 122A and when an operator manipulates haptic interface component 111B, such manipulation is detected by sensors 121B and, in response to sensor signal information from sensors 121B, control unit 118 updates the characteristics of simulated tool component 122B. For example, movement of haptic device 111B will cause corresponding movement of simulated tool component 122B in the simulated environment.

This one to one correspondence between haptic interface components 111 and simulated tool components 122 is not necessary. In some embodiments, operator manipulation of a haptic interface component 111 may cause control unit 118 to update the characteristics of more than one simulated tool component 122. For example, if device 100 is used to train pilots, a haptic interface component 111 may be the aircraft control stick. When an operator pulls on the control stick, one or more sensors 121 detect this motion and provide sensor signal information to control unit 118. Control unit 118 then uses this information to adjust the simulated orientation of the entire aircraft. When the simulated orientation of the aircraft is adjusted, the orientations of simulated tool components 122 corresponding to the landing gear, the ailerons, the nose of the aircraft, etc. may all be adjusted. In a similar manner, in some embodiments, operator manipulation of multiple haptic interface components 111 may cause control unit 118 to update the characteristics of a single simulated tool component 122.

As explained in more detail below, control unit 118 generates haptic feedback signals based at least in part on the interaction between simulated tool components 122 and object(s) 120 in the simulated environment. Control unit 118 provides these haptic feedback signals to actuators 112 which, in response to the haptic feedback signals, cause corresponding movement and/or resistance to movement of haptic interface components 111. As discussed in more detail below, the characteristics of these haptic feedback signals and the corresponding characteristics of actuators 112 are configured to represent actual interaction between real tool components and real objects. Operators of device 100 sense the movement and/or resistance to movement of haptic interface components 111 as tactile feedback. As explained in more detail below, control unit 118 also adjusts the visual representation 115 of the simulated environment to provide visual feedback to the operator.

As discussed briefly above, user interface 110 may also comprise one or more non-haptic interface devices 113, which may generally comprise any suitable input and/or output device, such as, buttons, switches, pointing devices and displays, for example, and which may form a part of haptic user interface 110A, visual user interface 110B or separate user interface components. In one particular embodiment, control unit 118 may cause non-haptic interface components 113 to provide additional audio and/or visual clues relating to the interaction of simulated tool component(s) 122 with simulated object(s) 120 in the simulated environment. By way of non-limiting example, non-haptic interface components 113 may provide an audio signal, a graphical representation and/or a text-based representation showing a state of interaction between simulated tool component(s) 122 and simulated object(s) 120. Such representations may be proportional to, correlated with, or related to, the force applied by a simulated tool component 122 on a simulated object 120. By way of non-limiting example, such a non-haptic interface component 113 may provide a bar chart representing the amount of force applied by a particular simulated tool component 122 on a simulated object 120.

Figure 2:
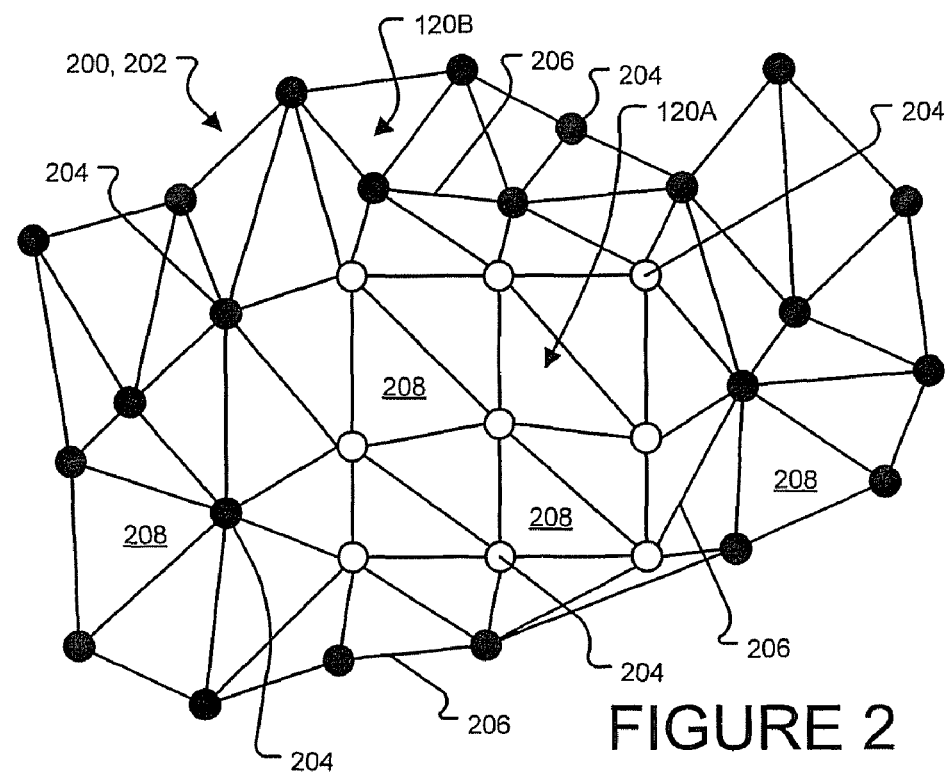
FIG. 2 is a schematic representation of a mesh which may be used to simulate an environment for operation of the FIG. 1 device in accordance with a particular embodiment of the invention.

FIG. 2 schematically depicts a simulated environment 200 in accordance with a particular embodiment of the invention. Simulated environment 200 may be maintained by control unit 118. Simulated environment 200 may be represented by mesh 202 of nodes 204 whose positions are known by control unit 118. As shown in FIG. 2, nodes 204 of mesh 202 may be schematically interconnected to one another by edges 206 to form triangular faces 208. While not visible in the schematic illustration of FIG. 2, mesh 202 may be three-dimensional to represent a surface in space.

As explained in more detail below, nodes 204, edges 206 and/or faces 208 may be independently defined with, or otherwise be assigned, certain characteristics that allow nodes 204, edges 206 and/or faces 208 to be and/or to behave in a manner that is distinct from one another. Using such characteristics, certain nodes 204, edges 206 and/or faces 208 may be designated to be part of one or more simulated objects 120 within simulated environment 200. Individual simulated objects 120 in environment 200 may therefore have characteristics that are different from one another and from the background (i.e. non-object portions) of simulated environment 200. In the illustrated example of FIG. 2, simulated environment 200 comprises a mesh 202 and the nodes 204 shown as white nodes 204 (together with their corresponding edges 206 and faces 208) define a rectangularly shaped simulated object 120A. Rectangularly shaped simulated object 120A is embedded within another object 120B made up of the black nodes 204 together with their corresponding edges 206 and faces 208.

The characteristics of nodes 204, edges 206 and/or faces 208 which are part of simulated objects 120 are used to simulate real objects (not shown). The differences in the characteristics of nodes 204, edges 206 and/or faces 208 may be used to reflect the differences between such real objects. By way of non-limiting example, real objects have characteristics such as shape, mass and deformability. As explained in more detail below, the characteristics of nodes 204, edges 206 and/or faces 208 may be used in simulated environment 200 to simulate these or other characteristics of real objects. The characteristics of nodes 204, edges 206 and/or faces 208 maintained by control unit 118 to define simulated object 120A may be different than the characteristics of nodes 204, edges 206 and/or faces 206 maintained by control unit 118 to define simulated object 120B, so that simulated objects 120A, 120B exhibit different properties. Using the characteristics of the individual nodes 204, edges 206 and/or faces 208, individual regions of a particular object 120 may have characteristics that are different from one another.

As discussed above, when an operator manipulates haptic interface components 111, simulated tool components 122 are manipulated within simulated environment 200. One possible manipulation of a simulated tool component 122 in response to operator manipulation of haptic interface components 111 is movement of the simulated tool component 122.

Movement of a simulated tool component 122 may result in a "contact event" between the simulated tool component 122 and a simulated object 120 within environment 200. Upon detection of a contact event, control unit 118 provides haptic feedback signals to actuators 112. As discussed above and in more detail below, such haptic feedback signals may be configured to represent actual interaction between real tool components and real objects (e.g. the reaction force of an actual object experienced by an actual tool component). The response of actuators 112 to these haptic feedback signals is sensed by operators as tactile feedback on haptic interface components 111. The haptic feedback signals generated by control unit 118 may be based on the characteristics of nodes 204, edges 206 and/or faces 208 which define the simulated object 120 contacted by simulated tool component 122.

Mesh 202 of simulated environment 200 may be maintained by control unit 118 in one or more data structures. FIG. 3A represent a simulated object 210 which is used for the purpose of describing a data structure suitable for maintaining mesh 202 in accordance with a particular embodiment of the invention. In FIG. 3A, simulated object 210 is a tetrahedron. Tetrahedron 210 comprises four nodes 204 ($V_0, V_1, V_2, V_3$), where the three-dimensional position coordinates of nodes 204 are: $V_0=(x_0,y_0,z_0)$; $V_1=(x_1,y_1,z_1)$; $V_2=(x_2,y_2,z_2)$; and $V_3=(x_3,y_3,z_3)$. In the illustrated embodiment, the three dimensional coordinates of nodes 204 of tetrahedron 210 are specified in Cartesian coordinates. This is not necessary. In general, the positions of nodes 204 may be specified in any suitable coordinate space.

Tetrahedron 210 may be represented in part by an array of nodes (referred to herein as a "node array"), wherein each node 204 represents an element in the node array. In a three dimensional mesh 202, each element of the node array may comprise three corresponding coordinates. Accordingly, for a three dimensional mesh 202 having N nodes 204, the node array has N elements, each element having three coordinates. For example, the node array representing tetrahedron 210 may be $<<(x_0,y_0,z_0)|(x_1,y_1,z_1)|(x_2,y_2,z_2)|(x_3,y_3,z_3)>>$. In general, the node array in this exemplary embodiment is an N×M array, where N represents the number of nodes 204 in the node array and M represents the number of pieces of information (e.g. number of positional coordinates) maintained for each node). In other embodiments, the information in the node array may be organized differently. For example, where it is known that M pieces of information (e.g. M=3 coordinates) will be maintained for each node 204, the node array may be maintained as a one-dimensional array of length M×N.

The node array defines the locations of nodes 204, but does not directly describe the edges 206 between nodes 204 or the faces 208 of tetrahedron 210. FIG. 3B schematically depicts the individual faces 208 ($F_0, F_1, F_2, F_3$) of tetrahedron 210. In accordance with one particular embodiment, tetrahedron 210 may also be represented in part by an index array, wherein each element of the index array represents a corresponding one of the faces 208 ($F_0, F_1, F_2, F_3$). As shown in FIG. 3B, the faces 208 of tetrahedron 210 may be defined by the nodes 204 at the corners of the faces, such that: $F_0 \equiv (V_0, V_1, V_3)$; $F_1 \equiv (V_0, V_3, V_2)$; $F_2 \equiv (V_0, V_2, V_1)$; and $F_3 \equiv (V_1, V_2, V_3)$. It will be noted (as shown in FIG. 3B and in the above definition of faces 208 of tetrahedron 210) that the order of the nodes in each element of the index array is counterclockwise around the face. The order of the nodes in each element of the index array may be used to define which side of the face is considered to point outward (i.e. which direction is normal to a side of the face). If the order of nodes is maintained in a consistent manner (e.g. counterclockwise around the face), then the starting node 204 may be varied. For example, $F_1$ may be equivalently specified in the index array by $F_1=(V_3, V_2, V_0)$ or $F_1=(V_2, V_0, V_3)$.

In one particular embodiment of the index array, each node is represented by its index in the corresponding node array. For example, for tetrahedron 210, the node $V_0$ may be represented by in the index array by its index 0, node $V_1$ may be represented by its index 1, node $V_2$ may be represented by its index 2, and node $V_3$ may be represented by its index 3. In accordance with this embodiment, the index array for tetrahedron 210 is given by: $<<(0,1,3)|(0,3,2)|(0,2,1)|(1,2,3)>>$. In general, the index array in this exemplary embodiment is an N×M array, where N represents the number of faces 208 in the index array and M represents the number of nodes 204 used to define each face 208. In the illustrated embodiment, there are three nodes 204 used to define each triangular face 208. In other embodiments, the information in the index array may be organized differently. For example, where it is known that there are M nodes 204 used to define each face 208, the node array may be maintained as a one-dimensional array of length M×N. In still other embodiments, where the number of nodes 204 used to define each face 208 is unknown, the index array may be a one dimensional array where indices corresponding to individual faces are delimited from one another by a delimiting indicator. For example, the index array of tetrahedron 210 may be given by $<<0,1,3,-1,0,3,2,-1,0,2,1,-1,1,2,3>>$, where the −1 is an example of a delimiting indicator. Those skilled in the art will appreciate that there are still other techniques for representing the data in the node and index arrays.

In particular embodiments, mesh 202 is maintained in such a manner that simulated objects 120 in environment 200 exhibit characteristics of deformability. Without limiting the generality of the invention disclosed herein, simulating deformable objects is particularly applicable to training operators of medical tools, equipment and/or devices, as such devices may be used to work on deformable animal (e.g. human) tissue.

FIG. 4 schematically illustrates a mesh 214 constructed in accordance with a particular embodiment of the invention useful for simulating deformable objects. In mesh 214, nodes 204 are modeled as point masses and edges 206 between nodes 204 are modeled as springs 206' (referred to as "edge springs" 206'). Furthermore, in mesh 214, additional springs 212 (referred to as "home springs") 212 are added to the model to connect nodes 204 to their original positions 204' (referred to as "home positions" 204'). In the FIG. 4 illustration, the actual positions of nodes 204 are shown as black circles and the home positions 204' of nodes 204 are shown as white circles. In the example shown in FIG. 4, the object represented by nodes 204 has been deformed such that nodes 204 are displaced generally upwardly from their home positions 204'. In the event that a simulated object 120 is deformed (e.g. because of interaction with a simulated tool component 122), edge springs 206' and home springs 212 tend to restore the simulated object 120 to its original (i.e. non-deformed) configuration (see detailed description below).

In particular embodiments of mesh 214, the characteristics of edge springs 206' and home springs 212 may be used to model objects with different levels of deformability. For example, a spring (e.g. edge springs 206' and/or home springs 212) may be modeled according to Hooke's law by specifying its spring constant $k_s$. In particular embodiments, objects that are relatively deformable may be modeled using edge springs 206' and home springs 212 with relatively low spring constants $k_s$ and objects that are relatively rigid may be modeled using edge springs 206' and home springs 212 with relatively high spring constants $k_s$. In some embodiments, the Hooke's law model may be modified by the inclusion of a damping constant $k_d$ as explained in more detail below.

Mesh 214 may be maintained by control unit 118 as a series of object type data structures which may be built up from the node array and index array discussed above. In one particular embodiment, mesh 214 may be maintained by data structures which include: mesh object(s); face object(s); edge spring object(s); and node object(s).

Figure 11:
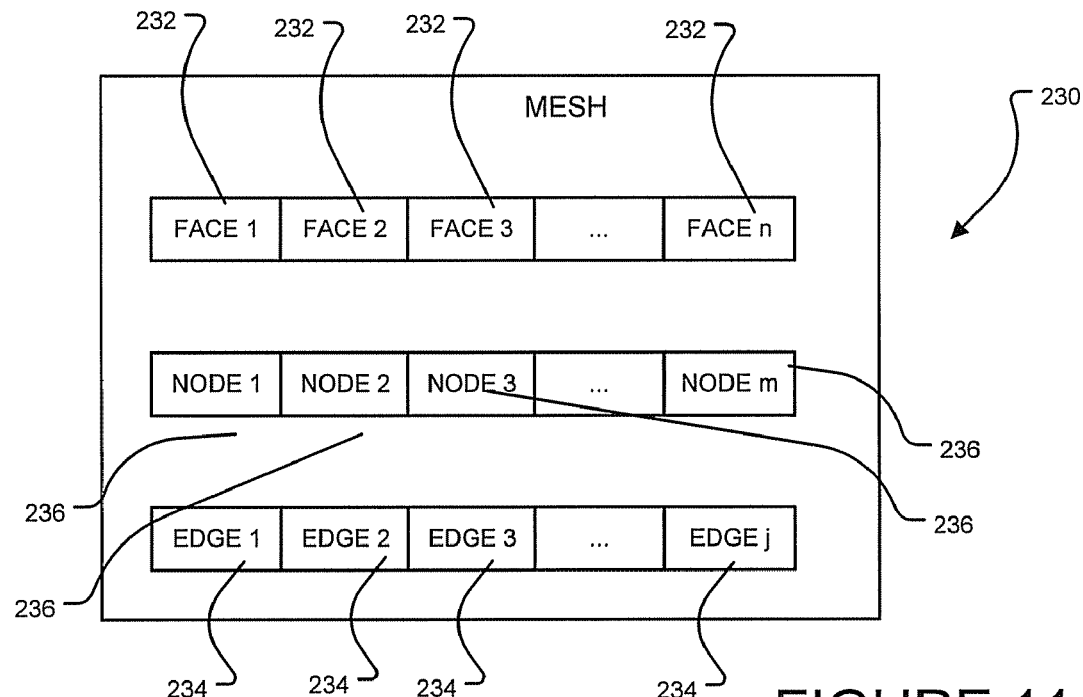
FIG. 11 is a schematic representation of a mesh data structure suitable for maintaining the FIG. 4 mesh according to a particular embodiment of the invention.

FIG. 11 depicts a mesh data structure 230 which may be used to model mesh 214 in accordance with a particular embodiment of the invention. In the illustrated embodiment, mesh data structure 230 includes pointers to n face data structures 232, j edge spring data structures 234 and m node data structures 236. In particular embodiments, each mesh data structure 230 is used to represent a corresponding simulated object 120 in simulated environment 200. This one to one relationship between mesh data structures 230 and simulated objects 120 is not necessary. In other embodiments, a single mesh data structure 230 may be used to represent multiple simulated objects 120 or multiple mesh data structures 230 may be used to represent a single simulated object 120.

Figure 12A:
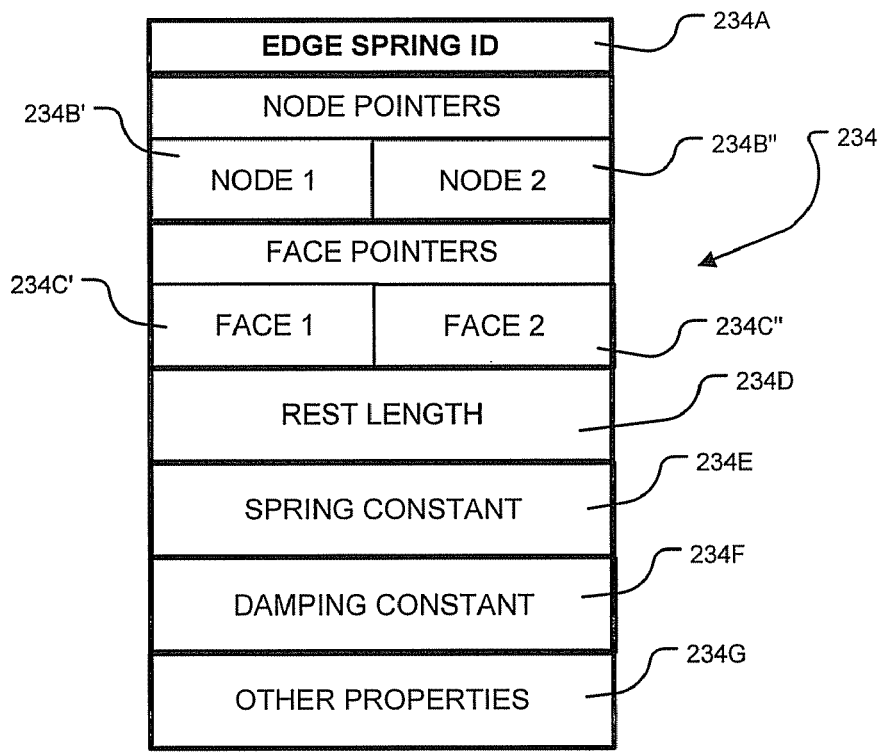
FIGS. 12A, 12B and 12C respectively depict schematic representations of spring, node and face data structures suitable for maintaining the FIG. 4 mesh according to a particular embodiment of the invention.
Figure 12B:
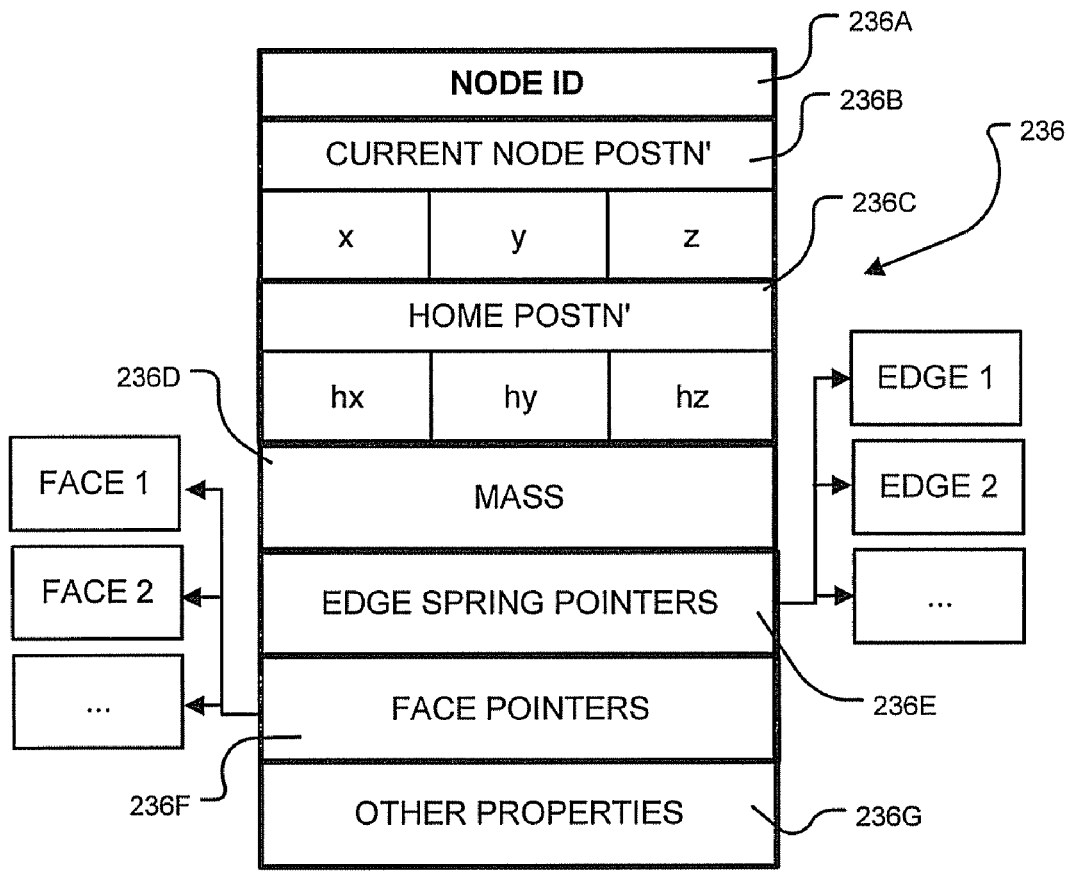
Figure 12C:
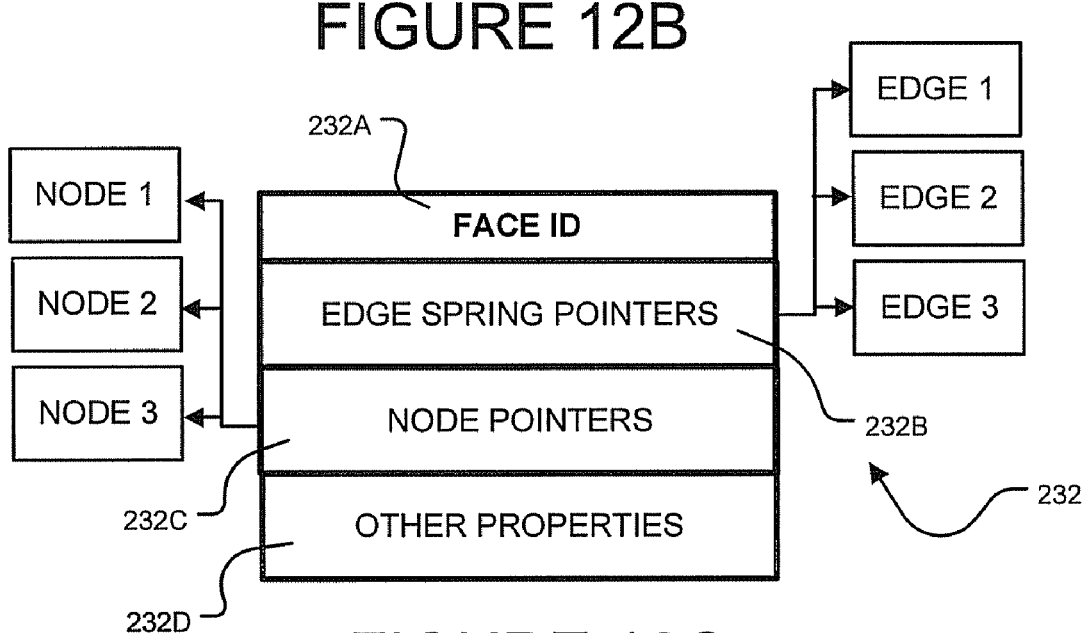

FIGS. 12A, 12B and 12C respectively depict schematic representations of an edge spring data structure 234, a node data structure 236 and a face data structure 232 according to a particular embodiment of the invention. In the illustrated embodiment, edge spring data structure 234 shown in FIG. 12A comprises a number of fields, including: an edge spring identifier 234A; a pair of node pointers 234B', 234B" (collectively, node pointers 234B) which point to the node data structures 236 corresponding to the pair of nodes 204 which define the edge spring 206'; a pair of face pointers 234C', 234C" (collectively, face pointers 234C) which point to the face data structures corresponding to the faces 208 on either side of the edge spring 206'; a rest length indicator 234D; a spring constant indicator 234E; and a damping constant indicator 234F. Edge spring data structure 234 may accommodate additional information which is represented in FIG. 12A as optional other properties field 234G. To simulate the tension of deformable objects, the rest length 234D of edge spring data structure 234 may be less than the distance between the home positions 204' of the nodes 204 that define the edge spring 206'.

As an illustrative example, the edge spring data structure 234 corresponding to the edge spring 206' between $V_0$ and $V_1$ ($E_{01}$) of tetrahedron 210 (FIGS. 3A, 3B) may include the following information: edge spring identifier $234A=E_{01}=E_{10}$; a pair of node pointers $234B' \rightarrow V_0$ and $234B' \rightarrow V_1$; a pair of face pointers $234C' \rightarrow F_2$ and $234C'' \rightarrow F_0$; a rest length indicator $234D=k_r*\text{abs}(\text{home}(V_0)-\text{home}(V_1))$—where $k_r$ is a constant ($0<k_r<1$), which relates the rest length to the distance between home positions 204' of nodes $V_0$ and $V_1$; a spring constant indicator $234E=k_s$; and a damping constant indicator $234F=k_d$.

In the illustrated embodiment, node data structure 236 shown in FIG. 12B comprises a number of fields, including: a node identifier 236A; a current position 236B of the node 204 which may include Cartesian coordinates (x, y, z) or some other suitable coordinates for defining the current node position; a home position 236C of the node 204 which may include Cartesian coordinates ($h_x$, $h_y$, $h_z$) or some other suitable coordinates for defining the home position of the node 204; a mass value 236D; a set of edge spring pointer(s) 236E which point to the edge spring data structures 234 corresponding to the edge springs 206' that connect to the node 204; and a set of face pointer(s) 236F which point to the face data structures 232 corresponding to the faces 208 that share the node 204. In general, the set of edge spring pointer(s) 236E may include any suitable number of pointer(s) and the set of face pointer(s) 236F may include any suitable number of pointer(s).

Node data structure 236 may accommodate additional information which is represented in FIG. 12B as optional other properties field 236G. For example, in a mesh 214 where the spring constant $k_s$ and the damping constant $k_d$ for home springs 212 are unique to each individual node 204, the spring constant $k_s$ and the damping constant $k_d$ for the home spring 212 of each individual node 204 may be stored in the other properties field 236G of node data structure 236. In other embodiments, the spring constant $k_s$ and the damping constant $k_d$ of home springs 212 are specified globally for each node 204 in mesh 214 and need not be separately stored in node data structure 236.

As an example, the node data structure 236 corresponding to node $V_1$ of tetrahedron 210 (FIG. 3A) may include the following information: node identifier $236A=V_1$; current position $236B=(x_1,y_1,z_1)$; home position $236C=(hx_1,hy_1,hz_1)$; a mass value $236D=m$; a set of edge spring pointer(s) 236E which includes pointers to edge spring data structures 234 corresponding to $E_{10}, E_{12}, E_{13}$; and a set of face pointer(s) 236F which includes pointers to face data structures 232 corresponding to $F_2, F_0, F_3$.

In the illustrated embodiment, face data structure 232 shown in FIG. 12C comprises a number of fields, including: a face identifier 232A; a set of edge spring pointer(s) 232B which point to the edge spring data structures 234 corresponding to the edge springs 206' that define the face 208; and a set of node pointer(s) 232C which point to the node data structures 236 corresponding to the nodes 204 that define the face 208. Face data structure 232 may accommodate additional information which is represented in FIG. 12C as optional other properties field 232D. In the illustrated embodiment, where faces 208 are triangles, the set of edge spring pointers 232B and the set of node pointers 232C both include three pointers.

As an example, the face data structure 232 corresponding to face $F_2$ of tetrahedron 210 (FIG. 3B) may include the following information: a face identifier $232A=F_2$; a set of edge spring pointer(s) 232B which point to the edge spring data structures 234 corresponding to edges $E_{02}, E_{21}, E_{10}$; and a set of node pointer(s) 232C which point to the node data structures 236 corresponding to $V_0, V_2, V_1$.

Control unit 118 can use the FIG. 4 mesh 214 and the data structures of FIGS. 11, 12A-12C to model deformation of simulated objects 120. Assume that the tetrahedron 210 of FIG. 3A is deformed by displacing node $V_0$ from its original location to a new location $V_0'$. The deformation of tetrahedron 210 and the resultant deformed tetrahedron 210' are shown schematically in FIG. 5. FIG. 5 shows the home spring 212 which extends between the $V_0$ home position 204 and the new position $V_0'$.

Figure 6:
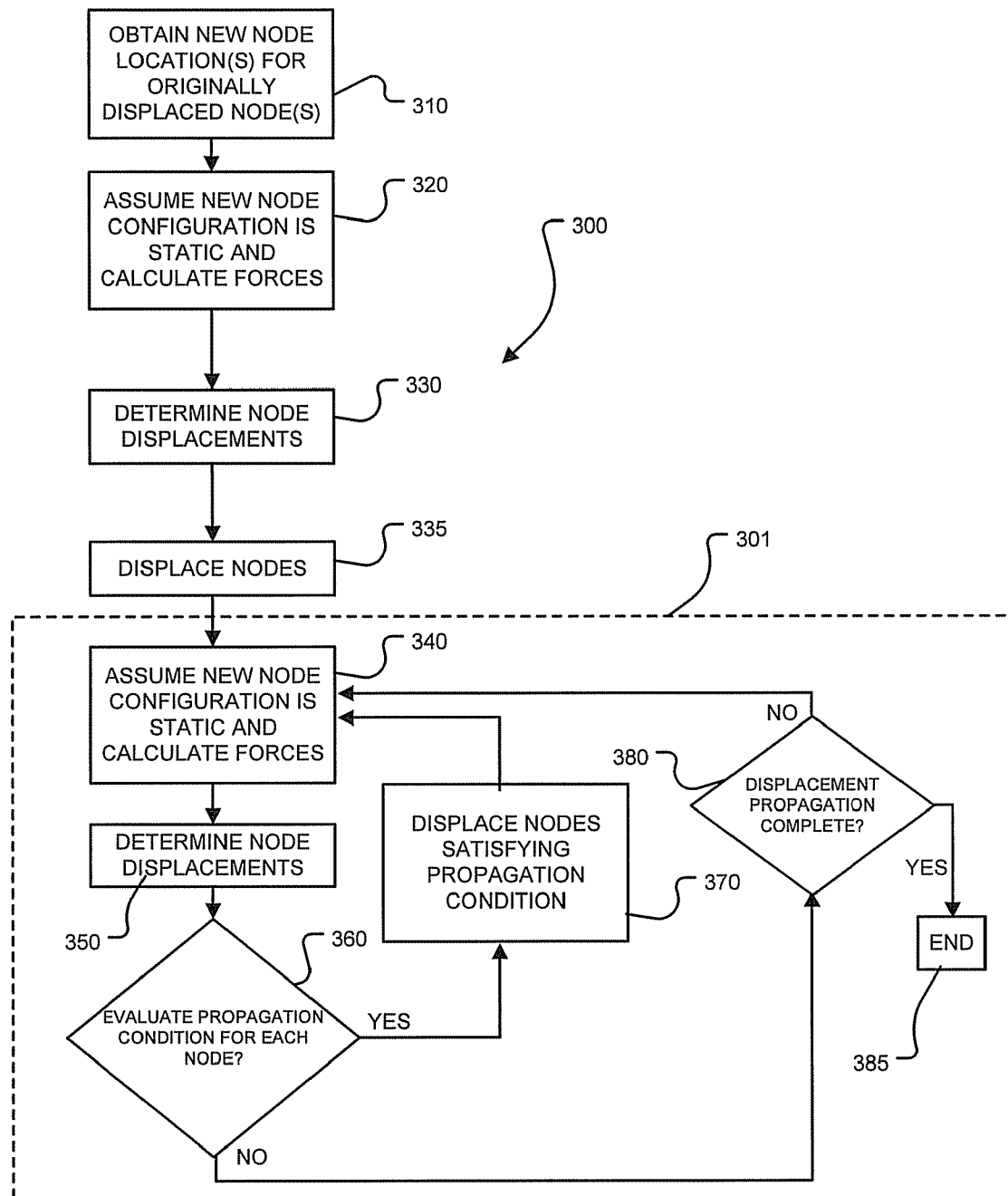
FIG. 6 schematically depicts a method for simulating deformation of simulated objects in the FIG. 4 mesh.

FIG. 6 schematically depicts a method 300 for simulating the deformation of simulated objects 120 in mesh 214. Method 300 may be performed at least in part by control unit 118. For the purpose of illustration only, portions of method 300 are described in relation to the deformation of tetrahedron 210 shown in FIG. 5.

Method 300 begins in block 310, where new position(s) are obtained for at least one node 204 (e.g. new position(s) that are displaced from home position(s) 204' of the node(s) 204). In the FIG. 5 deformation of tetrahedron 210, the only node 204 that has changed position is $V_0$ which has moved from $V_0=(x_0,y_0,z_0)$ to $V_0'=(x_0',y_0',z_0')$. Accordingly, block 310 involves obtaining a new location $V_0'=(x_0',y_0',z_0')$ for the node $V_0$. In general, block 310 involves obtaining new location(s) for a set X of nodes 204. The set X of nodes 204 displaced in block 310 may be referred to as the "originally displaced nodes" 204.

By way of non-limiting example, the new node location(s) determined in block 310 may be the result of a simulated tool component 122 interacting with the originally displaced nodes 204 of a simulated object 120. A method for obtaining the block 310 node location(s) for the circumstance when a simulated tool component 122 interacts with one or more nodes 204 is described in more detail below. For the purposes of simplifying the explanation of method 300, the new node location(s) determined in block 310 are taken as given.

In block 320, it is assumed that all nodes 204 are static in their block 310 positions and control unit 118 performs a force calculation. If a set X of nodes 204 is originally displaced in block 310, then the block 310 force calculation may be performed for the set Y of nodes 204, where the set Y includes the set X of originally displaced nodes 204 and the nodes 204 connected to the originally displaced nodes 204 by a single edge spring 206'. The nodes 204 connected to a particular node 204 by a single edge spring 206' may be referred to as the "level-one-connected nodes" of the particular node 204. The nodes 204 connected to the set X of originally displaced nodes 204 by a single edge spring 206' may be referred to as the "level-one-connected" nodes 204 of the set X. In the case of the FIG. 5 deformation of tetrahedron 210, the set X of originally displaced nodes 204 includes only the single node $V_0'$ and the set Y of nodes for which the force calculation is performed in block 320 may include the originally displaced node $V_0'$ and the level-one-connected nodes $V_1, V_2, V_3$. The concept of "level of connectedness" is explained in more detail below.

For each particular node 204, the block 320 force calculation involves determining: (i) the force contribution between the particular node 204 and all of the level-one-connected nodes 204 connected to the particular node 204 by a single edge spring 206'; and (ii) the force contribution on the particular node 204 from its home spring 212. These force contributions experienced by the particular node 204 are added (by vector addition) to determine a resultant force vector for the particular node 204.

In the example case of tetrahedron 210 of FIG. 5, the set Y of nodes 204 for which the block 320 calculation is performed may include nodes $V_0', V_1, V_2, V_3$. Determining the resultant force vector for node $V_0'$ involves: (i) calculating the individual vector force contributions between node $V_0'$ and edge springs 206' corresponding to each of its level-one-connected nodes $V_1, V_2, V_3$ and for home spring 212 corresponding to node $V_0'$; and (ii) adding these force contributions from edge springs 206' corresponding to each of the level-one-connected nodes $V_1, V_2, V_3$ and from home spring 212 to determine a resultant force vector on the node $V_0'$. The resultant force vectors associated with each of the other nodes $V_1, V_2, V_3$ in the set Y are calculated in a similar manner using their respective level-one-connected nodes. Since, in block 320 of the particular example of FIG. 5, nodes $V_1, V_2, V_3$ have not yet moved from their home positions, the block 320 force contribution from their respective home springs 212 is zero.

The force contribution to a particular node 204 from a particular edge spring 206' or from the particular home spring 212 corresponding to the particular node 204 may be calculated using a modified version Hooke's Law for springs which provides both a spring constant $k_s$ and a viscous damping constant $k_d$. In accordance with a particular embodiment, the force contribution $\overline{F}(n)$ experienced by a particular node 204 at a discrete time n due to a particular edge spring 206' or to a particular home spring 212 is given by:

$$F(n) = k_s[L(n) - L_R] - \frac{k_d[L(n) - L(n-1)]}{\Delta t} \quad (1)$$

and $$\overline{F}(n) = F(n)\frac{(\overline{V}_t - \overline{V}_i)}{|\overline{V}_t - \overline{V}_i|} \quad (2)$$

where:
$\overline{F}(n)$ is the vector force contribution of the particular edge spring 206' or the particular home spring 212 experienced by the particular node 204 at a discrete time n;
F(n) is the scalar magnitude of the force contribution of the particular edge spring 206' or the particular home spring 212 experienced by the particular node 204 at the discrete time n;
$k_s$ is the spring constant of the particular edge spring 206' or home spring 212;
$k_d$ is a damping constant of the particular edge spring 206' or home spring 212;
$L_R$ is the rest length of the particular edge spring 206'. This parameter may be zero for home springs 212;
L(n) is the current length of the particular edge spring 206' or home spring 212. In the case of a particular edge spring 206', this length is the scalar magnitude of the distance between the positions of the nodes 204 which define the particular edge spring 206' at discrete time n. In the case of a particular home spring 212, this length is the scalar magnitude of the distance between the current position of the particular node 204 and its home position 204' at discrete time n;
L(n−1) is the previous length of the particular edge spring 206' or home spring 212 at discrete time n−1;
$\overline{V}_i$ represents the current coordinates of the particular node 204 for which the equation (2) force F(n) is being calculated;
$\overline{V}_t$ represents the current coordinates of the terminal node 204 of the particular edge spring 206' or home spring 212. In the case of an edge spring 206', the terminal node $\overline{V}_t$ is the node 204 on the end of the particular edge spring 206' opposite the particular node $\overline{V}_i$. In the case of a home spring 212, the terminal node $\overline{V}_t$ represents the home position 204' of the particular node $\overline{V}_i$; and Δt is the time interval between time n and time n−1.

The net force vector $\overline{F}_{net}(n)$ experienced by a particular node 204 at a discrete time n may then be obtained by summing the vector force contributions from the edge springs 206' corresponding to each of its level-one-connected nodes 204 and from its home spring 212. At the conclusion of block 320, control unit 118 has determined a net force vector $\overline{F}_{net}(n)$ for each of the nodes 204 in the set Y which includes the set X of originally displaced nodes 204 and each of the level-one-connected nodes 204 of the set X. These net force vectors $\overline{F}_{net}(n)$ may represent the restoration force(s) of simulated object 120. For example, these net force vectors $\overline{F}_{net}(n)$ may represent the forces associated with a simulated object 120 trying to return to its original shape after being deformed in block 310 by interaction with simulated tool component 122 or otherwise.

After determining the net resultant forces experienced by the nodes 204 in block 320, method 300 proceeds to block 330 which involves determining displacements for nodes 204 in accordance with the block 320 net force vectors. Control unit 118 determines the displacement for each node 204 in accordance with Newton's second law $\bar{F}=m\bar{a}$. The displacement $\Delta\bar{p}$ of a particular node 204 under a net force $\bar{F}_{net}$ is given by $$\bar{p} = \int\int \bar{a} = \int\int \frac{\bar{F}}{m}.$$

According to one particular embodiment in the discrete time case, Newton's second law yields the following equation of motion for the position $\bar{p}(n)$ of a particular node 204 at time interval n:

$$\bar{p}(n) = \bar{p}(n-1) + \bar{v}(n-1)\Delta t + \frac{1}{2}\frac{\bar{F}_{net}}{m}(\Delta t)^2 \quad (3)$$

where:
- $\bar{p}(n)$ is the position of the particular node 204 at a discrete time n;
- $\bar{p}(n-1)$ is the position of the particular node 204 at a discrete time n−1;
- $\bar{v}(n-1)$ is the velocity of the particular node 204 at the discrete time n−1 and may be calculated by discrete time integration of $$\frac{\bar{F}_{net}}{m};$$

- m is the mass of the particular node 204;
- $\bar{F}_{net}$ is the net force vector experienced by the particular node 204 at the discrete time n (as calculated in block 320); and
- $\Delta t$ is the time interval between time n and time n−1.

Those skilled in the art will appreciate that there are various techniques by which the displacements $\bar{p}(n)$ may be computed from the net force $\bar{F}_{net}(n)$ using Newton's second law. Such techniques may involve discrete time integration or integration approximations and may comprise forward difference (i.e. non-causal) techniques or conventional difference (i.e. causal) techniques.

Block 330 involves determining the updated positions the nodes 204 in the set Y where the set Y includes the set X of originally displaced nodes 204 and the level-one-connected nodes 204 of the set X. The updated positions of these nodes 204 may be calculated according to equation (3). Block 335 involves displacing the nodes 204 in the set Y. The block 335 node displacements may be effected by applying the new node positions determined in block 330 to the current node position fields 236B of node data structures 236. For the particular case of tetrahedron 210 of FIG. 5, block 330 may involve determining the updated positions for each of nodes $V_0', V_1, V_2, V_3$ using equation (3) and block 335 may involve updating the node data structures 236 with the new node positions.

After the block 335 displacements, method 300 enters an iterative displacement propagation loop 301. Upon entering displacement propagation loop 301, method 300 proceeds to block 340. In the first iteration of block 340, mesh 214 has a new configuration (i.e. new node positions for the set Y of nodes 204) resulting from the block 335 node displacements. Block 340 involves determining the net resultant force vectors experienced by the nodes 204 of mesh 214 when nodes 204 are in these new positions. For each individual node 204, the block 340 force determination is substantially similar to the determination of net resultant force in block 320. Method 300 then proceeds to block 350 which involves determining the displacements for the nodes 204 of mesh 214 in accordance with the net resultant force vectors determined in block 340. For each individual node 204, the block 350 displacement determination is substantially similar to the block 330 determination of node displacement.

After the block 350 displacement determinations, method 300 proceeds to block 360, where a decision is made for each node 204 as to whether to continue propagation of the node displacement for that node. The block 360 decision may be based on a threshold condition. The block 360 threshold condition may be based, at least in part, on the "level of connectedness" of a particular node 204 to the originally displaced node(s), the magnitude of the net resultant force vector experienced by a particular node 204 as determined in the last iteration of block 340 and/or the magnitude of the displacement(s) determined for a particular node 204 in the last iteration of block 350. These block 360 threshold conditions may be substantially similar for various groups of nodes 204 within mesh 214, substantially similar for all of the nodes 204 within mesh 214 or different for different nodes 204 in mesh 214.

By way of non-limiting example, block 360 may involve deciding to continue propagating displacement for a particular node 204 when the magnitude of the displacement for the particular node 204 determined in the previous iteration of block 350 is greater than (or greater than or equal to) a certain cutoff threshold T and deciding to discontinue propagating displacement for the particular node 204 when the magnitude of the displacement for the particular node 204 is less than or equal to (or less than) the cutoff threshold T. Similarly, block 360 may involve deciding to continue propagating displacement for a particular node 204 when the magnitude of the net resultant force vector for the particular node 204 determined in the previous iteration of block 340 is greater than (or greater than or equal to) a certain cutoff threshold T and deciding to discontinue propagating displacement for the particular node 204 when the magnitude of the net resultant force vector for the particular node 204 is less than or equal to (or less than) the cutoff threshold T. Similarly, block 360 may involve deciding to continue propagation of displacement for a particular node 204 if its "level of connectedness" to one of the originally displaced nodes is less than (or less than or equal to) a cutoff threshold T and deciding to discontinue propagating displacement for the particular node 204 if its level of connectedness is greater than or equal to (or greater than) the threshold T. The thresholds T in the examples discussed above need not be constant and may also be variables. For example the thresholds T may be functions of other parameters and may vary as between individual nodes 204.

In block 360, method 300 splits on a node-by-node basis. For the particular nodes 204 where a block 360 decision is made to continue displacement propagation (block 360 YES output), method 300 proceeds to block 370 where control unit 118 applies the block 350 node displacements to these particular nodes 204. For each individual node 204, the block 370 application of node displacement may be substantially similar to the application of node displacement in block 335. After the application of node displacements in block 370, method 300 loops back to block 340 for another iteration of displacement propagation loop 301.

As discussed briefly above, if the block 310 originally displaced nodes belong to a set X, then the only nodes 204 for which the block 330 node displacements need be determined in block 330 and the only nodes 204 that will be displaced in block 335 belong to a set Y of nodes that includes the set X of originally displaced nodes and the level-one-connected nodes of the set X. The block 330/335 displacements are limited to this set Y of nodes, because the only springs 206', 212 that are extended/compressed at this time are the home springs 212 corresponding the set X of originally displaced nodes (which have moved from their home positions 204') and the edge springs 206' between the set X of originally displaced nodes and their level-one-connected nodes.

When method 300 reaches block 370 in the first iteration of displacement propagation loop 301 (i.e. the second displacement cycle), then the set Z of nodes 204 for which the block 350 node displacements are determined and, assuming the block 360 propagation conditions are satisfied for all nodes 204, the set Z of nodes 204 that will be displaced in block 370 include the set of nodes Y and the level-one-connected nodes of the set Y, or equivalently, the set of nodes X and the level 1 and level-two-connected nodes of the set X. In this description, the "level-n-connected nodes" of a particular node 204 represent the set of nodes that are connected to the particular node 204 by n different edges 206 or edge springs 206'. The integer n may be referred to as the "level of connectedness" of such nodes.

Figure 7:
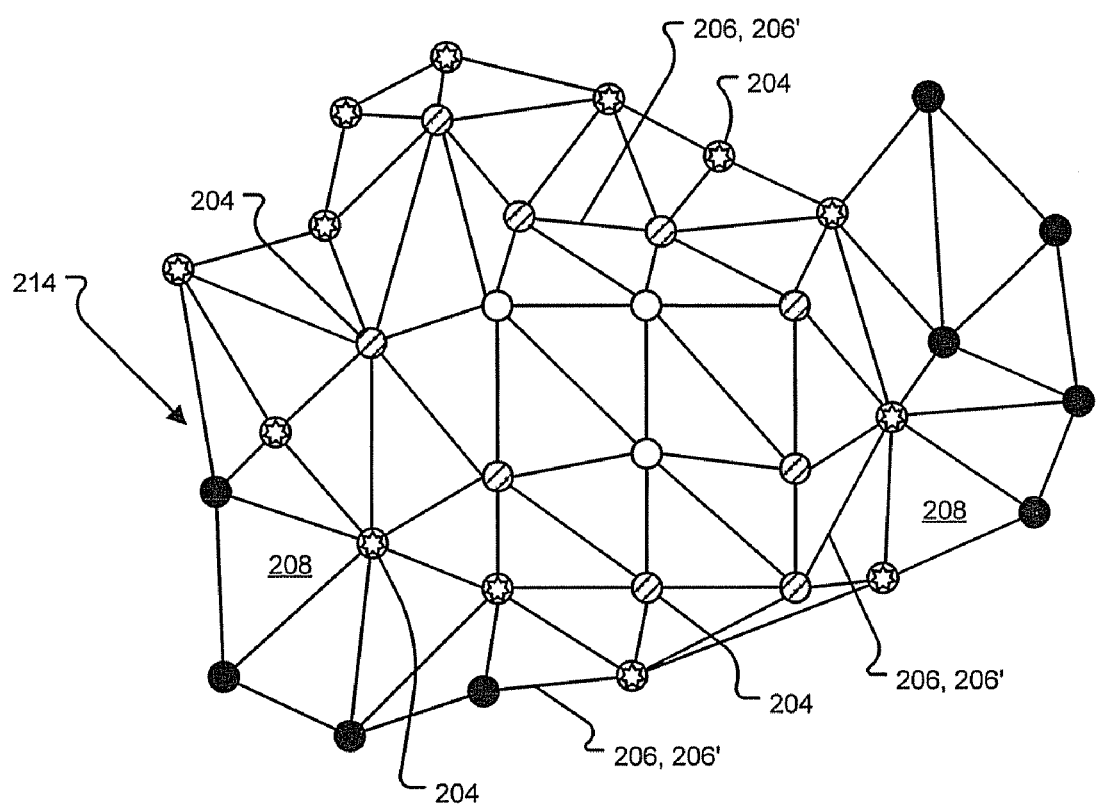
FIG. 7 schematically depicts the level of connectedness of particular nodes within the FIG. 4 mesh.

This concept is schematically depicted in mesh 214 of FIG. 7. In the FIG. 7 mesh 214, the unfilled (i.e. white) nodes 204 represent the set X of originally displaced nodes. In the FIG. 7 depiction, the hatched nodes represent the level-one-connected nodes of the set X and the set of nodes which are inscribed with a star represent the level-two-connected nodes of the set X. Accordingly, the set Y of nodes that is displaced in block 330 of method 300 includes the set X and the level-one-connected nodes of the set X (i.e. the unfilled nodes and the hatched nodes in FIG. 7). The set Z of nodes that may be displaced in the first iteration of displacement propagation loop 301 includes the set X, the level-one-connected nodes of the set X and the level-two-connected nodes of the set X (i.e. the unfilled, hatched and star-inscribed nodes in FIG. 7).

Referring back to FIG. 6, for the particular nodes where a block 360 decision is made to discontinue displacement propagation (block 360 NO output), method 300 bypasses block 370 (i.e. no displacements are applied to these particular nodes 204). Method 300 proceeds to block 380 which involves a decision as to whether node displacement propagation is complete. The block 380 decision may be based, at least in part, on the number of iterations of displacement propagation loop 301, the number of nodes 204 for which displacements are still being applied and/or the number of nodes 204 for which displacements are were applied but are no longer being applied (i.e. because of a negative propagation condition in block 360). In one particular embodiment, the block 380 decision involves continuing displacement propagation (a block 380 NO output) if there are any number of nodes 204 for which the block 360 decision is YES and only deciding that displacement propagation should be discontinued (a block 380 YES output) when the block 360 decision is NO for all nodes 204. If control unit 118 makes a decision in block 380 to continue node displacement propagation (block 380 NO output), then method 300 loops back to block 340 for another iteration of displacement propagation loop 301. If, on the other hand, control unit 118 makes a decision to discontinue node displacement propagation (block 380 YES output), then method 300 proceeds to block 385 where node displacement propagation ends.

Figure 8A:
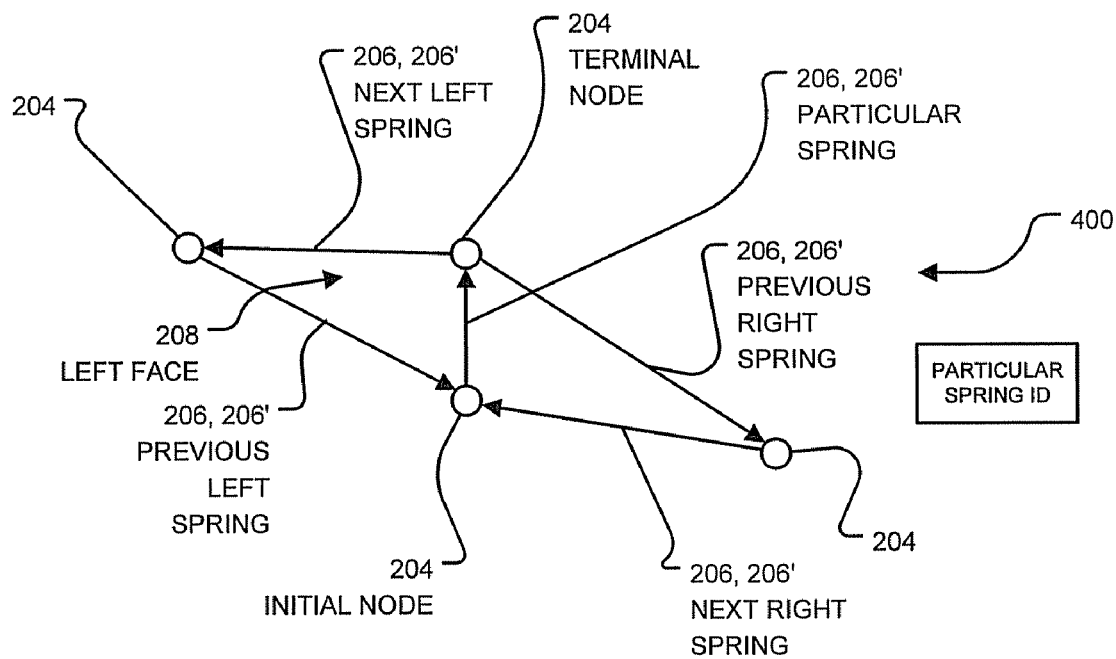
FIGS. 8A and 8B schematically depict a half-spring data model suitable for maintaining a mesh in accordance with another embodiment of the invention.
Figure 8B:
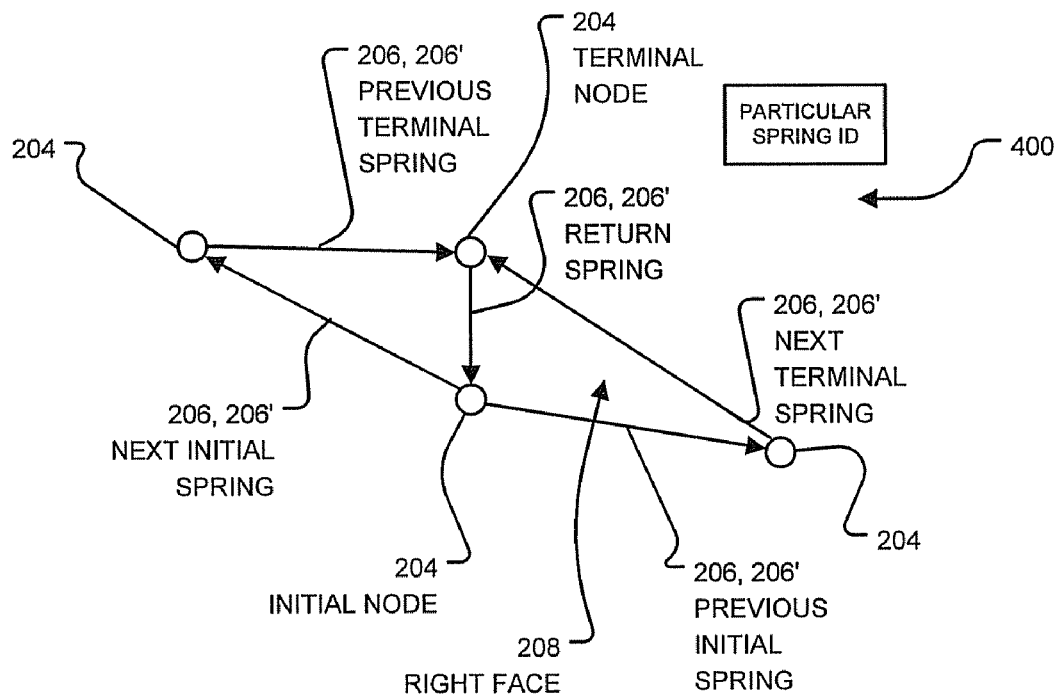

FIGS. 8A and 8B schematically depict the elements of a data model 400 (referred to herein as a "half-spring data model") which may enhance the functionality of the above-described data structures for some applications. Half-spring data model 400 may be used to help maintain a mesh (not shown) similar to mesh 214 discussed above and half-spring data model 400 makes use of nodes 204, edges 206/edge springs 206' and faces 208 as shown in FIGS. 8A, 8B. Half-spring data model 400 differs from the above-described model of mesh 214 in that half-spring data model 400 models each edge 206 as a pair of directed springs 206' referred to herein as "half-edge springs" 206'. In some embodiments, each half-edge spring 206' of half-spring data model 400 is assigned a spring constant $k_s$ that is half the value of the corresponding spring constant in the full spring model of FIGS. 12A-12C, although this is not necessary. The damping constant $k_d$ may be selected for each half-edge spring 206' such that the resultant mesh 214 is stable. In some embodiments, the damping constants $k_d$ are selected to determine the characteristic response of half-edge springs 206'. In particular embodiments, it is desirable for the damping constants $k_d$ to be selected such that the resultant mesh exhibits an over-damped response. Half-spring data model 400 maintains adjacency information which may be used by control unit 118 to provide computational efficiency.

Half-spring data model 400 may be explained and defined in relation to a "particular half-edge spring" 206' (FIG. 8A), which is a directed half-edge spring 206' that extends from an "initial node" 204 to a "terminal node" 204. FIGS. 8A and 8B show the other elements of half-spring data model 400 which are defined in relation to the particular half-edge spring 206', the initial node 204 and the terminal node 204. These elements include: next left spring 206', previous left spring 206', left face 208, previous right spring 206', next right spring 206', previous terminal spring 206', next initial spring 206', next terminal spring 206', previous initial spring 206' and right face 208.

Half-spring data model 400 may be implemented by control unit 118 in a manner similar to mesh 214 described above. Control unit 118 may maintain half-edge mesh data structures, half-edge spring data structures, half-edge node data structures and half-edge face data structures. The half-edge mesh data structure may be substantially similar to mesh data structure 230 (FIG. 11), except that spring data structures 234 are replaced by half-edge spring data structures 434, node data structures 236 are replaced by half-edge node data structures 436 and face data structures 232 are replaced by half-edge face data structures 432.

Figure 13A:
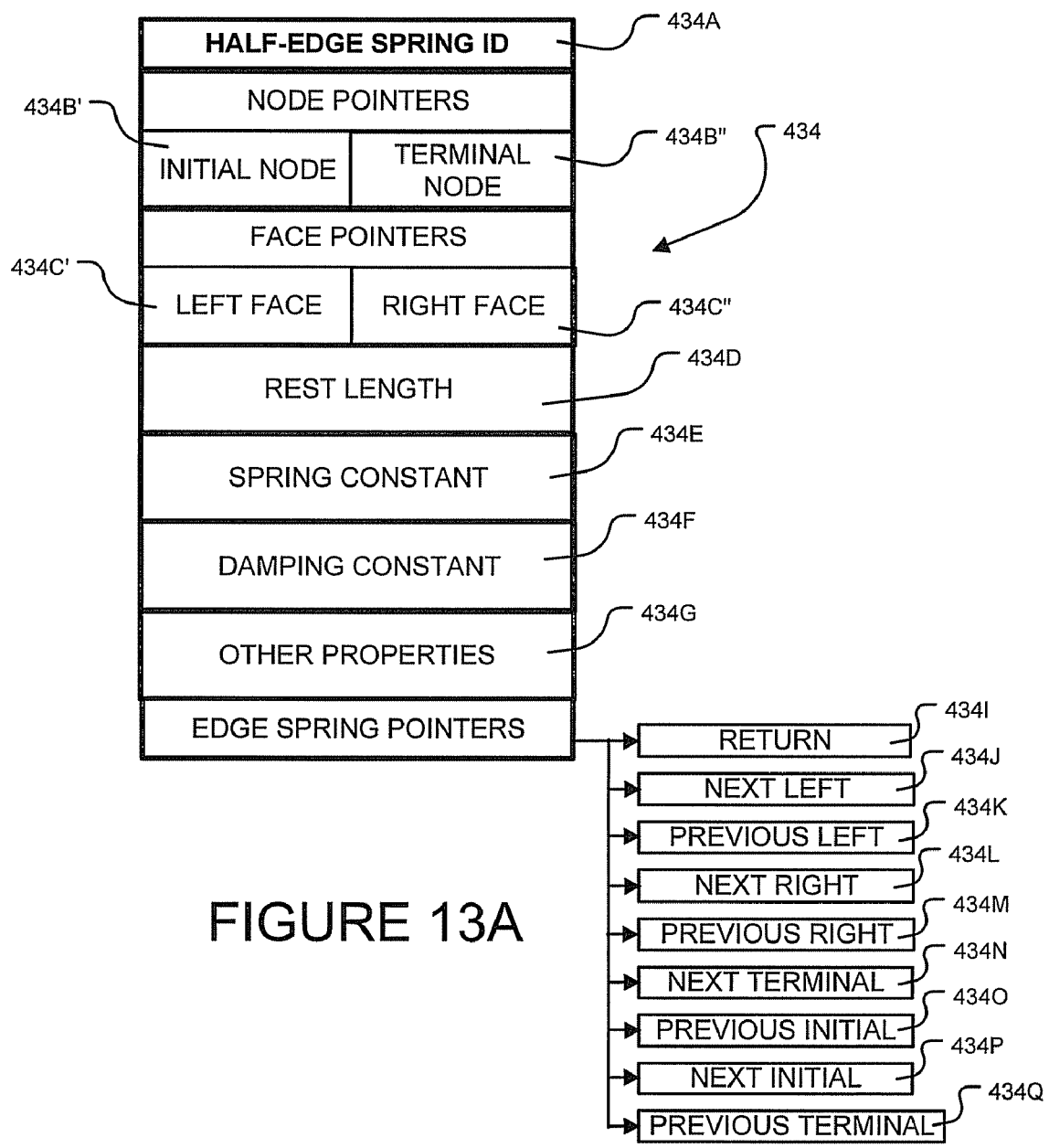
FIGS. 13A, 13B and 13C respectively depict schematic representations of half-spring, node and face data structures suitable for maintaining the FIGS. 8A and 8B half-spring data model according to a particular embodiment of the invention.
Figure 13B:
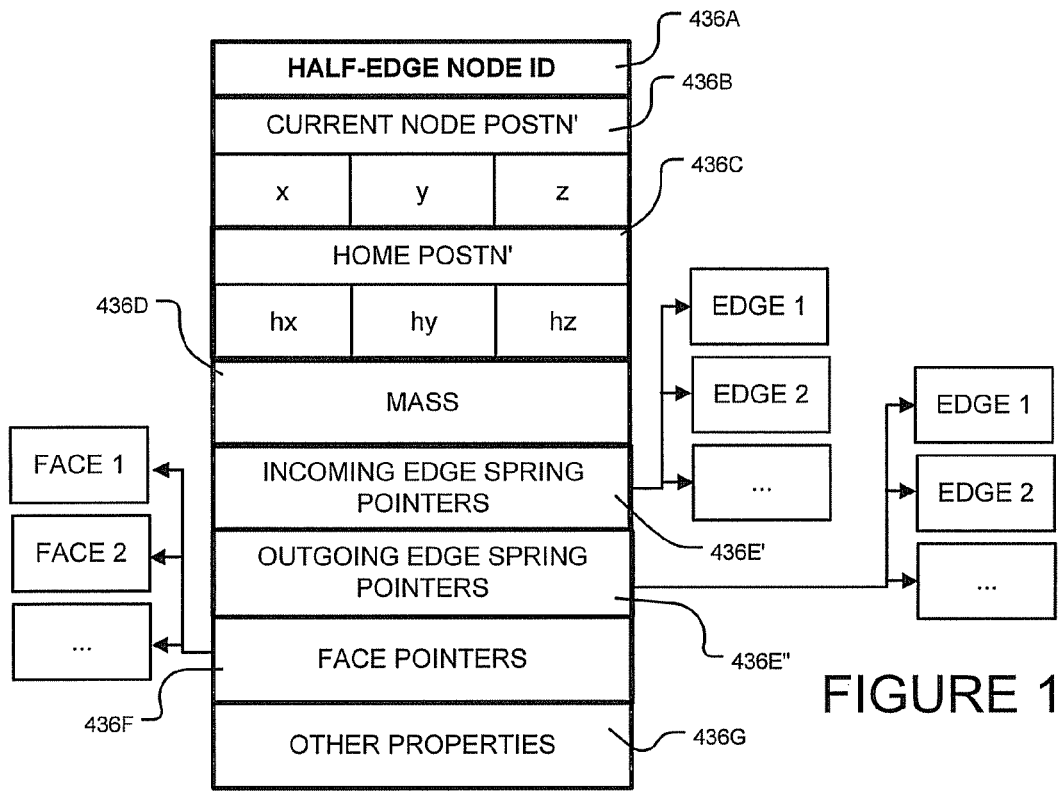
Figure 13C:
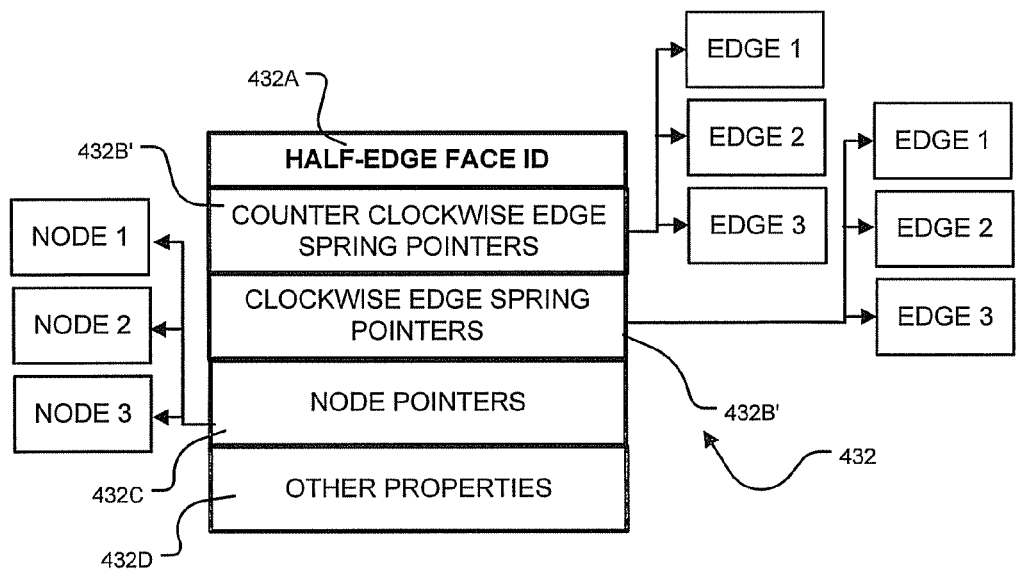

FIGS. 13A, 13B and 13C respectively depict schematic representations of a half-edge spring data structure 434, a half-edge node data structure 436 and a half-edge face data structure 432 according to a particular embodiment of the invention. In many respects, half-edge spring data structure 434, half-edge node data structure 436 and half-edge face data structure 432 are similar to spring data structure 234, node data structure 236 and face data structure 232 of FIGS. 12A-12C. Similar features of half-edge spring data structure 434, half-edge node data structure 436 and half-edge face data structure 432 are assigned similar reference numerals to those of spring data structure 234, node data structure 236 and face data structure 232, except that the reference numerals of half-edge spring data structure 434, half-edge node data structure 436 and half-edge face data structure 432 are preceded by a "4" rather than a "2".

Half-edge spring data structure 434 (FIG. 13A) differs from spring data structure 234 (FIG. 12A) in that: node pointers 434B', 434B" specifically point to the half-edge node data structures 436 corresponding to an initial node and a terminal node of the particular half-edge spring 206' to give directionality to half-edge spring 206'; and face pointers 434C', 434C" specifically point to the half-edge face data structures 432 corresponding to the left and right faces. In addition, in the illustrated embodiment, half-edge spring data structure 434 comprises an additional field made up of pointers to other half-edge spring data structures 434 corresponding to: the return spring 434I, the next left spring 434J, the previous left spring 434K, the next right spring 434L, the previous right spring 434M, the next terminal spring 434N, the previous initial spring 434O, the next initial spring 434P and the previous terminal spring 434Q (see FIGS. 8A, 8B). As discussed above, in some embodiments, spring constant 434E of each half-edge spring 206' in half-edge spring data structure 434 is half the value of the corresponding spring constant 234E in spring data structure 234. In other respects, half-edge spring data structure 434 may be similar to edge spring data structure 234.

Half-edge node data structure 436 (FIG. 13B) differs from node data structure 236 (FIG. 12B) in that edge pointers 236E are replaced by incoming edge pointers 436E' which point to half-edge spring data structures 434 which have the node 204 as a terminal node (field 434B") and outgoing edge pointers 436E" which point to half-edge spring data structures 434 which have the node 204 as an initial node (field 434B'). In other respects, half-edge node data structure 436 is similar to node data structure 236.

Half-edge face data structure 432 (FIG. 13C) differs from node data structure 232 (FIG. 13C) in that edge pointers 232B are replaced by counter clockwise edge pointers 432B' which point to half-edge spring data structures 434 that circumscribe the face 208 in a counter clockwise direction (i.e. half-edge spring data structures 434 that have a pointer to the face 208 in the left face field 434C') and clockwise edge pointers 432B" which point to half-edge spring data structures 434 that circumscribe the face 208 in a clockwise direction (i.e. half-edge spring data structures 434 that have a pointer to the face 208 in the right face field 434C"). In other respects, half-edge face data structure 432 is similar to face data structure 232.

FIGS. 8A, 8B, 13A, 13B and 13C schematically illustrate the elements which may be used to define half-spring data model 400 in accordance with a particular embodiment of the invention. In other embodiments, additional or alternative elements may be used as a part of a half-spring data structure. For the purposes of explanation, the embodiment illustrated in FIGS. 8A, 8B, 13A, 13B and 13C shows a comprehensive listing of the fields used to define half-spring data model 400. In practice, however, it is not necessary for control unit 118 to maintain all of the elements of half-spring data model 400 shown in FIGS. 8A, 8B, 13A, 13B and 13C, as control unit 118 may derive many of elements of half-spring data model 400 from a smaller subset of the data elements. For example, if the initial node pointer 434B' and the return spring pointer 434I are known for all half-edge spring data structures 434, then terminal node pointer 434B" is not required. It will be appreciated that the terminal node 204 for any particular half-edge spring 206' corresponds to the initial node 204 of the return spring 206' (see FIGS. 8A, 8B). Those skilled in the art will appreciate that many different subsets of the elements shown in FIGS. 8A, 8B, 13A, 13B and 13C can be used to fully determine the illustrated elements of half-edge data model 400.

Figure 9A:
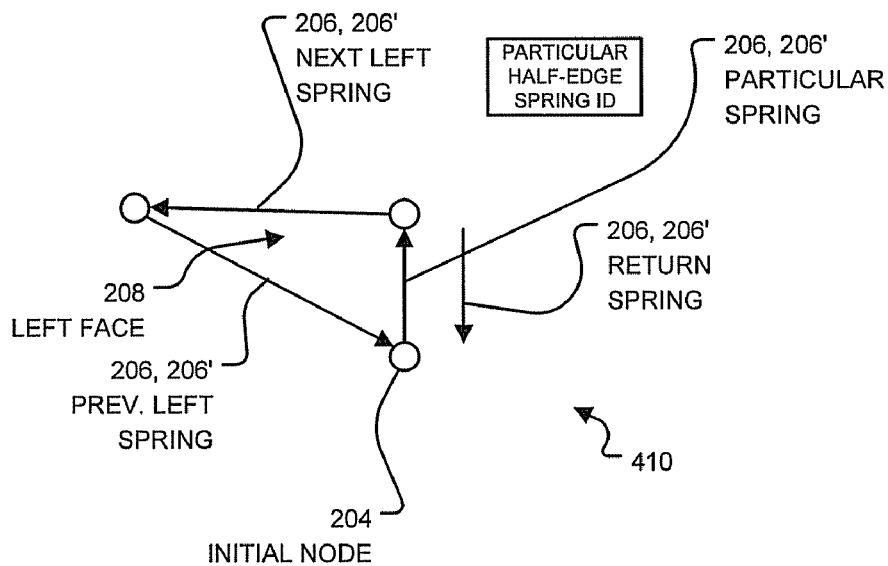
FIG. 9A schematically depicts a subset of the elements of the half-spring data model of FIGS. 8A and 8B which may be maintained by a control unit in accordance with a particular embodiment.
Figure 9B:
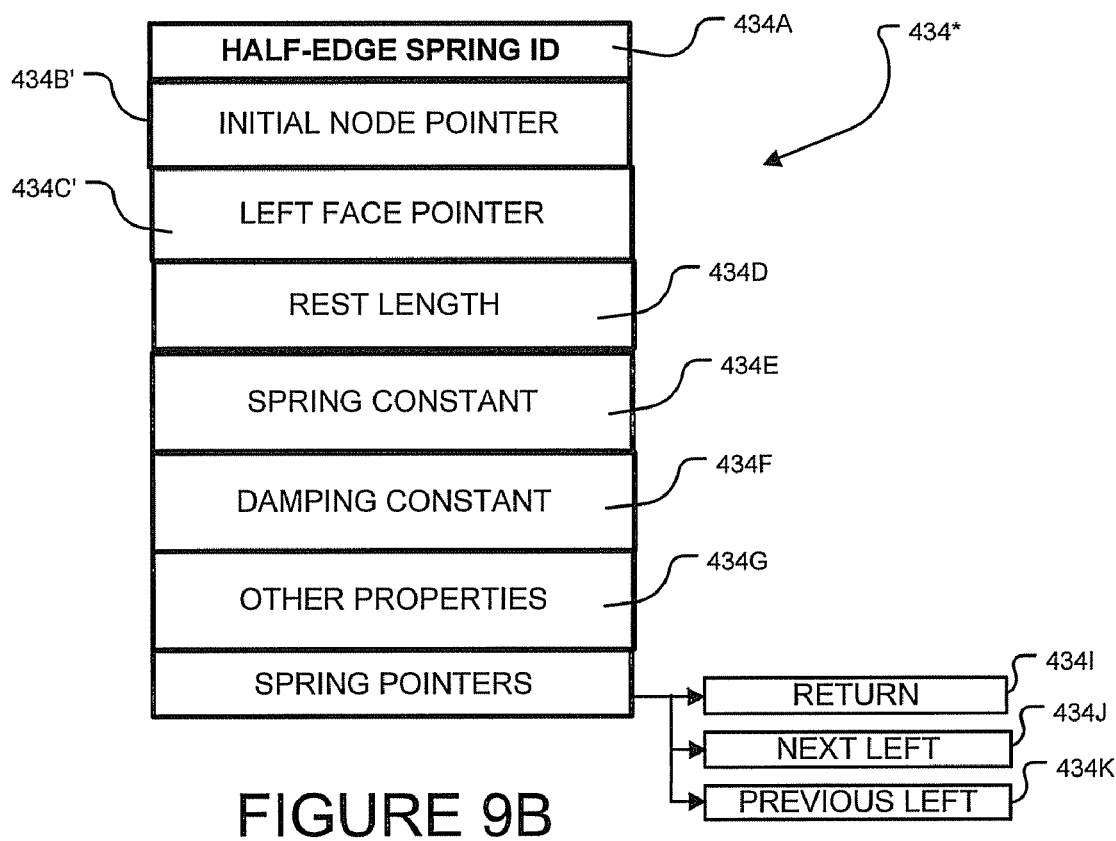
FIG. 9B is a schematic representation of a half-spring data structure suitable for maintaining the FIG. 9A subset of the elements of the half-spring data model of FIGS. 8A and 8B.

In one particular embodiment of the invention shown schematically in FIG. 9A, control unit 118 maintains the subset 410 of the elements of half-spring data model 400. FIG. 9B schematically represents a half-edge spring data structure 434* suitable for maintaining the FIG. 9A subset 410 of the elements of the half-spring data model 400. Half-edge spring data structure 434* includes a subset of the fields of half-edge spring data structure 434 described above. The half-edge node data structures 436 and half-edge face data structures 432 used to maintain subset 410 may be substantially similar to the half-edge node data structures 436 and half-edge face data structures 432 described above.

The FIGS. 9A, 9B subset 410 of data elements includes:
- half-edge spring ID—a unique identifier (e.g. an integer) corresponding to the particular half-edge spring 206'—field 434A;
- the characteristics of the particular half-edge spring 206' (not shown in FIG. 9A), which may include the spring constants $k_s$ (field 434E), the damping constant $k_d$ (field 434F) and the rest length (field 434D) of the particular half-edge spring 206', for example;
- return spring pointer—field 434I;
- initial node pointer—field 434B';
- left face pointer—field 434C';
- next left spring pointer—field 434J; and
- previous left spring pointer—field 434K.

One advantage of half-spring data model 400 is that half-spring data model 400 maintains adjacency information. Using half spring data model 400, control unit 118 is able to determine the level of connectedness of various nodes 204 in the mesh 214. Control unit 118 is therefore able to determine which nodes 204 of the mesh may experience forces and corresponding displacements in response to movement of particular nodes (e.g. by interaction with simulated tool components 122). By way of non-limiting example, in method 300, control unit may use adjacency information from half-spring data model 400 in blocks 320 and 330 to limit the block 320 force calculations and the block 330 displacement calculations to the level-one-connected nodes. Similarly, by using this adjacency information from the half-spring data model 400 in each iteration of the displacement propagation loop 301, control unit 118 may limit the block 340 force calculation and the block 350 displacement calculations to the appropriate level of connectedness. In one embodiment, the forces calculated in block 320 may involve performing calculations for half-springs 206' that have the originally displaced node(s) as their initial node (i.e. where initial node pointer 434B' points to the originally displaced node(s)) and corresponding home springs 212. Similarly, on the nth iteration of displacement propagation loop 301, the block 340 force calculation may be limited to performing calculations for half-springs 206' where initial node pointer 434B' points to one of the level n–1 connected nodes and corresponding home springs 212.

Figure 10A:
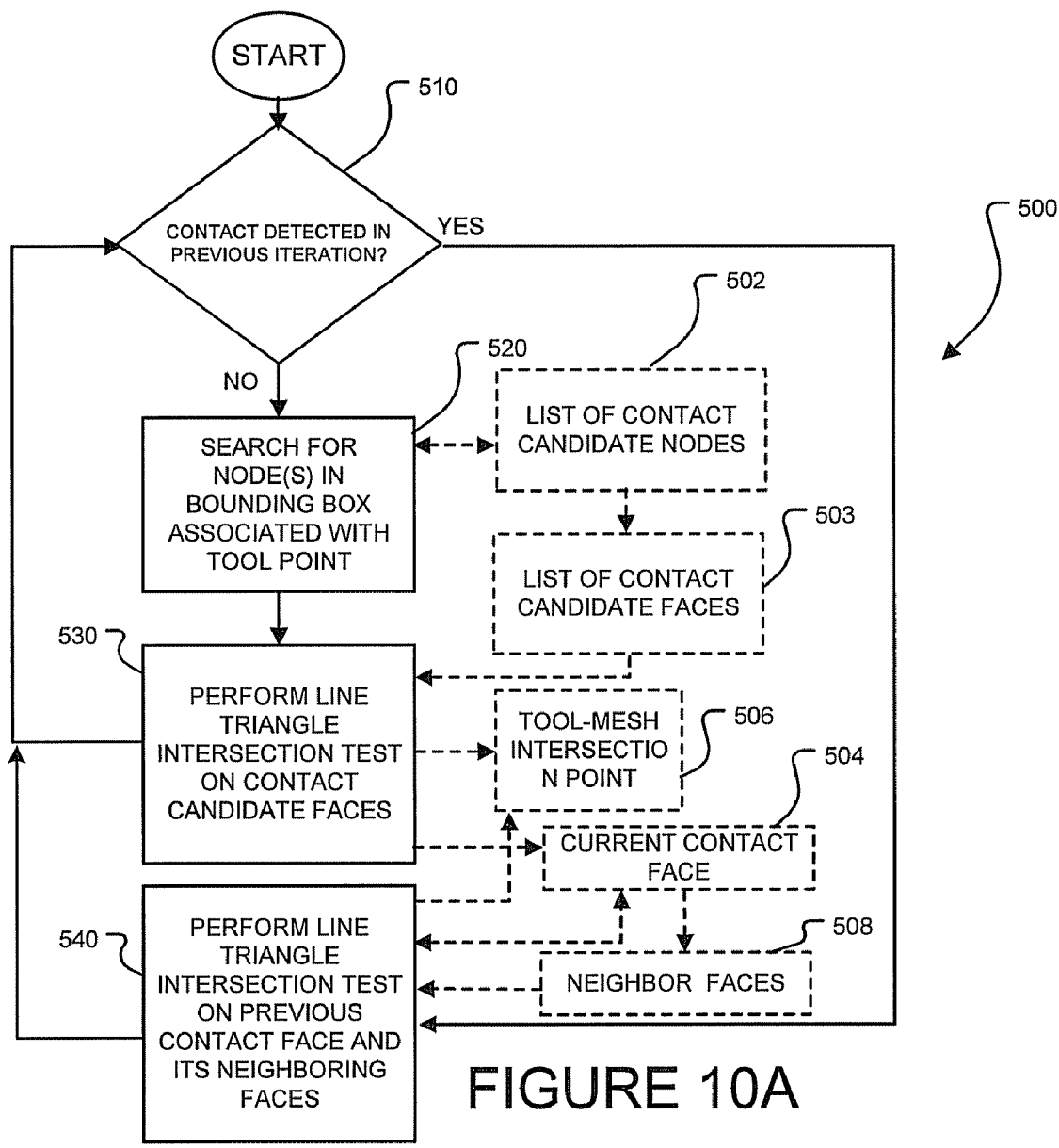
FIG. 10A schematically depicts a method for detecting a contact event between a simulated tool component of the FIG. 1 device and a simulated object in accordance with a particular embodiment of the invention.

Method 300 described above (FIG. 6) commences in block 310 when control unit 118 detects the movement of one or more originally displaced nodes 204. In haptic operator-training device 100, one circumstance that can give rise to the displacement of nodes 204 is an interaction between a simulated tool component 122 and the nodes 204 corresponding to a simulated object 120. FIG. 10A schematically depicts a method 500 for detecting contact between a simulated tool component 122 and a simulated object 120 according to a particular embodiment of the invention. It is assumed (for the purpose of simplifying explanation) that an extremity of the simulated tool component 122 under consideration in method 500 may be defined by a single point, referred to herein as the "simulated tool point" 123A and that the simulated tool component 122 extends from the simulated tool point 123A along a simulated tool axis 123B. Those skilled in the art will appreciate that more complex simulated tool components 122 may be defined by a plurality of individual simulated tool points 123A and that method 500 can be extended such that each of the plurality of individual simulated tool points 123A can interact with the mesh that represents the simulated object 120.

Figure 10B:
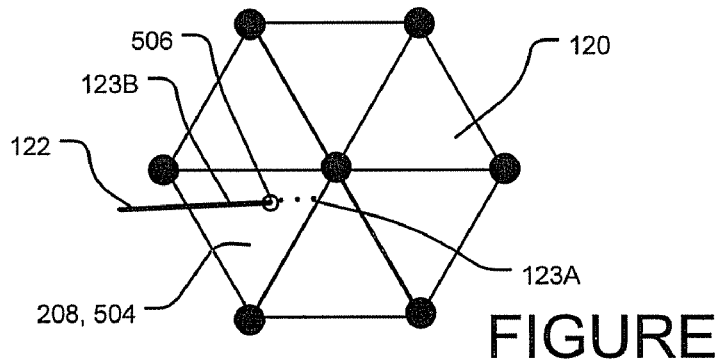
FIG. 10B schematically depicts a contact event detected according to the FIG. 10A method.

FIG. 10B schematically depicts a contact event between a simulated object 120 (embodied as a mesh) and a simulated tool component 122 having a simulated tool point 123A and a tool axis 123B. In the FIG. 10B illustration, simulated tool component 122 interacts with a face 208 referred to as the "current contact face" 504. FIG. 10B shows that a contact event occurs when simulated tool point 123A is located within (or at least on) the exterior surface of a simulated object 120 and that simulated tool axis 123B extends from the simulated tool point 123A through (or at least from) the current contact face 504. The point 506 at which simulated tool axis 123B intersects current contact face 504 is referred to as the "tool-mesh intersection point" 506.

Referring back to FIG. 10A, method 500 commences in block 510, which involves an inquiry into whether a contact event was detected in a previous iteration of method 500. If no contact event was detected in the previous iteration (block 510 NO output), then method 500 proceeds to block 520. In block 520, control unit 118 defines a "bounding box" (not shown) around simulated tool point 123A. The bounding box may be a three-dimensional cuboid (or some other shape (e.g. cylinder or sphere)), which surrounds the location of simulated tool point 123A. The characteristics of the block 520 bounding box may be dependent on the movement history of simulated tool point 123A. For example, when simulated tool point 123A has been moving in a particular direction, then the block 520 bounding box may extend further in this particular direction than in other directions. As another example, when simulated tool point 123A is moving relatively fast, the block 520 bounding box may be relatively large. As a part of block 520, control unit 118 cycles through nodes 204 of the mesh in the simulated environment and determines whether any nodes 204 of simulated object 120 are located within the bounding box.

In some embodiments, block 520 may involve one or more techniques to limit the ambit of the block 520 search (i.e. the number of nodes 204 which must be evaluated). For example, if it is known that simulated tool point 123A is located at a particular location at a discrete time n, then there may be a maximum search range around the particular location at a discrete time n+1. As another example, the simulated environment may be divided into voxels and a basic binary test may be performed to determine if simulated tool point 123A is in certain voxels defined around the simulated object 120. The block 520 search can then be limited to the nodes 204 in the indicated voxel.

Where control unit 118 determines that a node 204 of the simulated object 120 is located within the bounding box, then the node 204 is assigned to a list of contact candidate nodes 502. At the conclusion of block 520, control unit 118 has populated a list of contact candidate nodes 502. Of course, if the simulated tool component 122 is not proximate to the simulated object 120, then the list of contact candidate nodes 502 may be empty at the conclusion of block 520.

Method 500 then proceeds to block 530, where control unit 118 uses the list of contact candidate nodes 502 to obtain a corresponding list of contact candidate faces 503. In one particular embodiment, the list of contact candidate faces 503 includes all of the faces 208 pointed to by the face pointer fields 236F, 436F of the node data structures 236, 436 (FIGS. 12B, 13B) corresponding to the list of contact candidate nodes 502. After obtaining the list of contact candidate faces 503, control unit 118 performs a "line-triangle intersection test" on each face 208 in the list 503 to determine whether the simulated tool axis 123B intersects the face 208 (i.e. whether the tool-mesh intersection point 506 is located on the face 208). For each face 208 in the list of contact candidate faces 503, the block 530 line-triangle intersection test may comprise a geometrical evaluation of whether the simulated tool axis 123B intersect a particular face 208. A positive line-triangle intersection test in block 530 indicates that a contact event has occurred and control unit 118 concludes that the face 208 which resulted in the positive line-triangle test is the current contact face 504 and that the tool-mesh intersection point 506 is the location of the intersection between the current contact face 504 and the tool axis 123B. Method 500 then loops back to bock 510 for the next iteration.

If, in block 510, control unit 118 determines that a contact event was detected in a previous iteration of method 500 (block 510 YES output), then method 500 bypasses the bounding box procedures of block 520 and proceeds to block 540. Block 540 involves performing the line-triangle intersection test on the current contact face 504 of the previous iteration and, if necessary, the neighboring faces 508 to the current contact face 504 of the previous iteration. Block 540 is similar to block 530 except that the list of candidate contact faces 503 is replaced with the current contact face 504 and its neighboring faces 508. If there is a positive line-triangle intersection test in block 540, then control unit 118 updates the current contact face 504 and the current tool-mesh intersection point 506 if necessary. Block 540 is discussed in greater detail below. After block 540, method 500 loops back to block 510 for another iteration. In this manner, control unit 118 continually monitors for updates in the interaction between simulated tool components 122 and simulated objects 120.

When a contact event between a simulated tool component 122 and a simulated object 120 is detected in method 500, it is desirable for the operation of device 100 to model the outcome of this contact event. In particular embodiments of the invention, one or more of the simulated objects 120 in environment 200 are deformable objects. In such embodiments, modeling a contact event between a simulated tool component 122 and a simulated object 120 may involve moving (i.e. deforming) the mesh used to model simulated object 120. Again, for the purposes of simplifying explanation, it is assumed that a simulated tool component 122 has an associated simulated tool point 123A and simulated tool axis 123B and that a contact event has been detected (in accordance with method 500 or otherwise) between the simulated tool component 122 and a current contact face 504 at the tool-mesh intersection point 506. Those skilled in the art will appreciate that more complex simulated tool components 122 may be modeled by a plurality of individual simulated tool points 123A and that the deformation methods described herein can be extended to accommodate multiple tool points. It is also assumed, for the time being, that simulated tool component 122 models a blunt tool (i.e. a tool which can deform simulated object 120 but will not cut simulated object 120).

As discussed above (see FIG. 10B), a contact event corresponds to the condition that simulated tool point 123A is located within (or at least on) the exterior surface of a simulated object 120 and that simulated tool axis 123B extends from the simulated tool point 123A through (or at least from) the current contact face 504. Tool-mesh intersection point 506 is at the intersection of tool axis 123B and current contact face 504. The invention comprises a number of different methods for modeling this contact event which are referred to herein as: the sticky node interaction technique; the shrink face interaction technique; and the push face interaction technique.

The sticky node interaction technique is shown schematically in FIGS. 14A and 14B where FIG. 14A shows the occurrence of a contact event on the undeformed object 120 and FIG. 14B shows how object 120 is deformed in response to the contact event. In the sticky node interaction technique, control unit 118 causes the mesh to deform in response to the contact event such that one of the nodes 204 of the current contact face 504 is made to coincide with simulated tool point 123A. In the illustrated example of FIGS. 14A and 14B, the node 204* is made to coincide with simulated tool point 123A. Node 204* may be referred to as the current "sticky node". When sticky node 204* coincides with simulated tool point 123A, tool-mesh intersection point 506 also coincides with simulated tool point 123A. The selection of the sticky node 204* from among the nodes 204 of current contact face 504 may be made on the basis of some suitable metric (e.g. distance) between the nodes 204 of current contact face 504 and simulated tool point 123A and/or between the nodes 204 of current contact face 504 and tool-mesh intersection point 506.

FIGS. 15A and 15B schematically depict the shrink face interaction technique for deforming a mesh in response to a contact event, where FIG. 15A shows the occurrence of a contact event on the undeformed object 120 and FIG. 15B shows how object 120 is deformed in response to the contact event. In the shrink face interaction technique, all of the nodes 204 of current contact face 504 are made to coincide with simulated tool point 123A (i.e. current contact face 504 "shrinks" to the location of simulated tool point 123A). When all of the nodes 204 of current contact face 504 coincide with simulated tool point 123A, tool-mesh intersection point 506 also coincides with simulated tool point 123A.

FIGS. 16A and 16B schematically depict the push face interaction technique for deforming a mesh in response to a contact event, where FIG. 16A shows the occurrence of a contact event on the undeformed object 120 and FIG. 16B shows how object 120 is deformed in response to the contact event. In the push face interaction technique, all of the nodes 204 of current contact face 504 are moved toward a state where simulated tool point 123A touches (but does not penetrate) current contact face 504 (i.e. such that tool-mesh intersection point 506 coincides with simulated tool point 123A). The amount by which each of the nodes 204 of current contact face 504 is moved may be determined by some suitable metric (e.g. distance) between the node 204 and simulated tool point 123A or between the node 204 and tool-mesh intersection point 506, subject to the constraint that after movement of all of the nodes 204 of current contact face 504, simulated tool point 123A touches (but does not penetrate) current contact face 504.

Figure 17:
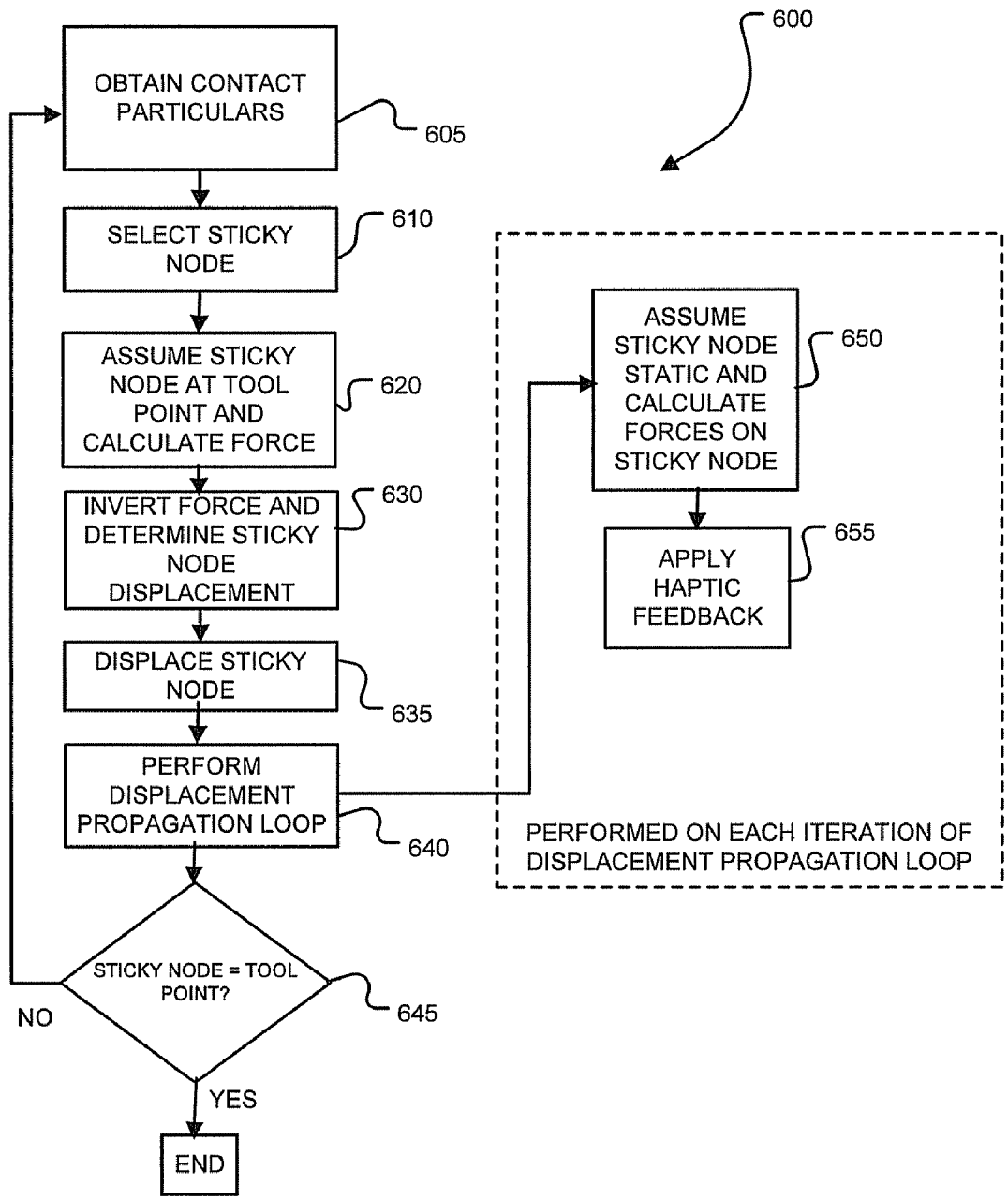
FIG. 17 schematically depicts of a method of modeling the deformation of a simulated object in response to interaction with a simulated tool.

FIG. 17 is a block diagram showing a method 600 of deforming a mesh in response to a contact event according to a particular embodiment of the invention. The contact event may be detected by method 500 described above. In the illustrated embodiment of FIG. 17, method 600 uses the sticky node interaction technique shown in FIGS. 14A, 14B, but method 600 may be adapted to use the shrink face interaction technique (FIGS. 15A, 15B) or the push face interaction technique (FIGS. 16A, 16B) as discussed in more detail below. Method 600 commences in block 605 where control unit 118 obtains the particulars of a contact event. Such contact event particulars may include: current contact face 504, the location of simulated tool point 123A, the direction of tool axis 123B and tool-mesh intersection point 506. Some of these contact event particulars may come from method 500. Method 600 then proceeds to block 610 where one of the nodes 204 of current contact face 504 is selected to be sticky node 204*. The block 610 sticky node selection may be based on some suitable metric (e.g. distance) between the nodes 204 of current contact face 504 and simulated tool point 123A or between the nodes 204 of current contact face 504 and tool-mesh intersection point 506. In one particular example, the node 204 of current contact face 504 closest to simulated tool point 123A is selected to be sticky node 204*.

In block 620, control unit 118 assumes that sticky node 204* is located at the location of simulated tool point 123A and calculates the net force experienced by sticky node 204* due to edge springs 206' connected to sticky node 204* and due to the home spring 212 of sticky node 204*. The force components due to each edge spring 206' connected to sticky node 204* and due to the home spring 212 of sticky node 204* are added by vector addition to determine a net force $F_{net}(n)$ experienced by sticky node 204*. The block 620 force calculation may be substantially similar to the block 320 force calculation described above in relation to method 300 (see FIG. 6).

In block 630, the block 620 net force is inverted (i.e. multiplied by −1) and is applied to sticky node 204* to determine a displacement of sticky node 204* in response to this inverted force. The block 630 displacement calculation for sticky node 204* may be substantially similar to the displacement calculation for each individual node 204 described in block 330 above (see FIG. 6). Method 600 then proceeds to block 635 where the block 630 displacement is applied to sticky node 204*(i.e. sticky node 204* is actually moved to the location calculated in block 630). The block 635 displacement of sticky node 204* results in sticky node 204* moving toward (but typically not all the way to) the location of simulated tool point 123A.

Method 600 then proceeds to block 640. Block 640 is a displacement propagation loop similar to displacement propagation loop 301 discussed above. In method 600, the "originally displaced node" is sticky node 204* which is displaced in block 635. The block 640 displacement propagation loop allows the block 635 displacement of sticky node 204* to propagate through the remainder of the mesh corresponding to simulated object 120, causing the mesh to deform in response to the movement of sticky node 204*.

The block 640 displacement loop differs from the block 301 displacement loop in two respects. Firstly, sticky node 204* is prevented from further movement during the block 640 displacement propagation loop. That is, the other nodes 204 of simulated object 120 are permitted to move in the block 640 propagation loop, but sticky node 204* is maintained in its block 635 location. Secondly, on each iteration through the block 640 displacement propagation loop, the forces experienced by sticky node 204* are calculated in block 650 and are used to generate haptic feedback in block 655. Blocks 650 and 655 are explained in more detail below.

Blocks 650 and 655 may be performed in each iteration of the block 640 displacement propagation loop and allow control unit 118 to provide haptic feedback to a user operating device 100. In block 650, control unit 118 calculates the net force on sticky node 204* resulting from its new (block 635) location. This net force may be the result of edge springs 206' which connect sticky node 204* to its level-one-connected nodes 204 and the home spring 212 of sticky node 204*. Control unit 118 then uses this block 650 force in block 655 to determine haptic feedback signals and to output these haptic feedback signals to haptic user interface 110A. In particular embodiments, the block 655 haptic feedback signals are based on a component of the block 650 force that is normal to the surface of simulated object 120.

The haptic feedback signals determined in block 655 (based at least in part on the block 650 force (e.g. the normal component of the block 650 force)) are used to control haptic actuators 112. As discussed above, haptic actuators 112 are used to provide haptic feedback to a user operating haptic interface components 111 (e.g. by moving haptic interface components 111 or resisting movement of haptic interface components). Accordingly, the user begins to feel the interaction of simulated tool component 122 and simulated object 120. In the illustrated embodiment, blocks 650 and 655 are performed on each iteration of the block 640 displacement propagation loop to account for the possibility that the edge springs 206' connected to sticky node 204* may lengthen or shorten during the block 640 displacement propagation loop. This is not necessary. In some embodiments, blocks 650 and 655 are only performed once each time that sticky node 204* is displaced in block 635.

Once the block 640 displacement propagation loop is concluded, method 600 moves to block 645 which involves an inquiry into whether sticky node 204* has reached simulated tool point 123A. In some embodiments, the block 645 inquiry may be whether sticky node 204* has reached a vicinity (i.e. within a threshold distance) of simulated tool point 123A. If sticky node 204* has not reached simulated tool point 123A (block 645 NO output), then method 600 loops back to block 605 for another iteration. Each iteration of method 600 causes sticky node 204* to come closer to the location of simulated tool point. If sticky node 204* has reached simulated tool point 123A or a suitable vicinity thereof (block 645 YES) output, then method 600 ends.

When method 600 ends, the mesh corresponding to simulated object 120 is deformed by simulated tool component 122 and simulated object 120 and simulated tool component 122 are in equilibrium. In addition, at the conclusion of method 600, the user is experiencing (at haptic interface components 111) the haptic feedback that is associated with the deformation of simulated object 120 by simulated tool component 122. Although not explicitly shown in method 600, controller 118 may also update other aspects of user interface 110 in response to the interaction of simulated tool component 122 and simulated object 120. Method 600 may operate much more quickly than the time scale on which a user causes significant movement of simulated tool component 122 using haptic interface component(s) 111. When method 600 concludes this fast (relative to the time scale or movement of simulated tool component 122), the user will not experience the iterative deformation of simulated object 120. Instead, it will appear and feel to the user as if simulated tool component 122 causes the deformation of simulated object 120 in real time. In practice, the speed of method 600 will depend on the hardware and software used for its implementation.

Method 600 may be modified to provide a method for deforming a mesh in response to a contact event using the shrink face interaction technique (FIGS. 15A, 15B). In the shrink face interaction technique, all of the nodes 204 of current contact face 504 are made to coincide with simulated tool point 123A. Thus, method 600 may be modified to work with the shrink face interaction technique by assuming that all three nodes 204 of the current contact face 504 are sticky nodes 204*. Accordingly: all three nodes 204 of current contact face 504 may be selected as sticky nodes 204* in block 610; in block 620, it may be assumed that all three sticky nodes 204* are located at simulated tool point 123A and the forces may be calculated for all three sticky nodes 204*; the displacements for all three sticky nodes 204* may be determined in block 630 and effected in block 635; the locations of all three sticky nodes 204* may be maintained static during the block 640 displacement propagation loop; block 645 may involve an inquiry into whether all three sticky nodes 204* have converged to simulated tool point 123A; and the block 650 calculation of haptic feedback force may comprise a function (e.g. a linear combination, a weighted or unweighted average or the like) of the forces on the three sticky nodes 204*.

Method 600 may be modified to provide a method for deforming a mesh in response to a contact event using the push face interaction technique (FIGS. 16A, 16B). In the push face interaction technique, all of the nodes 204 of current contact face 504 are moved in such a manner that the simulated tool point 123A touches (but does not penetrate) current contact face 504. For a particular simulated tool point 123A, the locations of the nodes 204 of current contact face 504 which achieve this objective may be determined by geometrical calculation. The locations of the nodes 204 of current contact face 504 which achieve this objective for a particular simulated tool point 123A may be referred to as the "desired push face node locations". Method 600 may be modified for the push face interaction technique by assuming that all three nodes 204 of current contact face 504 are made to converge iteratively to their respective desired push face node locations. Accordingly: all three nodes 204 of current contact face 504 may be selected in block 610; in block 620, it may be assumed that all three nodes 204 of current contact face 504 are located at their respective desired push face node locations and the forces may be calculated for all three nodes 204; the displacements for all three nodes 204 of current contact face 504 may be determined in block 630 and effected in block 635; the locations of all three nodes 204 of current contact face 504 may be maintained static during the block 640 displacement propagation loop; and block 645 may involve an inquiry into whether all three nodes 204 of current contact face 504 have converged to their respective desired push face locations.

In the push face interaction technique, the block 650 calculation of forces may involve performing the calculation for all three nodes 204 of the current contact face 504 and then calculating the haptic force as a function (e.g. a linear combination, a weighted or unweighted average or the like) of the force contribution from each node 204. In one particular embodiment, the weight provided to the force from each node 204 is ⅓ (i.e. the block 655 feedback is the average of the forces experienced by the three nodes 204 of current contact face 504). In other embodiments, the weight applied to the force from each node 204 is weighted in proportion to (or weighted as some other function of) a suitable metric (e.g. distance) between the node 204 and simulated tool point 123A or between the node 204 and tool-mesh intersection point 506.

The above discussed interaction between a simulated tool component 122 and a simulated object (i.e. method 600 and its modifications for the shrink face and push face interaction techniques) assumes that simulated tool component 122 and simulated tool point 123A are static once simulated tool component 122 interacts with the mesh corresponding to simulated object 120. As discussed above, method 600 may be relatively fast in relation to the scale on which a user is capable of moving simulated tool component 122 using haptic interface components 111. Accordingly, the assumption that simulated tool component 122 and simulated tool point 123A are static during method 600 may be valid in some cases. However, as described in more detail below, this assumption is not necessary.

Method 600 may accommodate further movement of simulated tool component 122 and simulated tool point 123A. For example, once simulated tool component 122 has started to interact with simulated object 120 (and method 600 has commenced), a user may "slide" simulated tool component 122 across the surface of simulated object 120 or otherwise move simulated tool component 122 in relation to simulated object 120. In general, the relative movement between simulated tool component 122 and simulated object 120 can occur during method 600 or after the completion of method 600. In addition, the relative movement between simulated tool component 122 and simulated object may be within current contact face 504 or such relative movement may be into a new face (i.e. such that current contact face 504 changes). These cases are discussed in turn below.

If simulated tool component 122 moves within a particular current contact face 504 during method 600, then the position of simulated tool point 123A and tool-mesh intersection point 506 may be updated in block 605 during each iteration of method 600. In some cases of the sticky node interaction technique, this change in location of simulated tool point 123A and/or tool-mesh intersection point 506 may result in a different node 204 of the particular current contact face 504 being selected as the sticky node 204* in block 610. Also, in the push face interaction technique, the change in location of simulated tool point 123A may cause changes in each of the desired push face node locations. In other respects, method 600 may proceed as described above even though the location of simulated tool point 123A has moved.

If simulated tool component 122 moves within the same current contact face 504 after the completion of method 600, then method 600 restarts and the new position of simulated tool point 123A and tool-mesh intersection point 506 are assigned in block 605.

In some situations, a user may cause simulated tool component 122 to move in such a manner that current contact face 504 changes. This change in current contact face 504 may be detected in block 540 of method 500 (FIG. 10A). In the simplest case, the user causes simulated tool component 122 to move away from simulated object 120 (i.e. such that there is no longer any contact between simulated tool component 122 and simulated object 120). When control unit 118 detects, in block 540, that there is no longer any contact between simulated tool component 122 and object 120, control unit 118 discontinues method 600 (if necessary) and commences method 300 (FIG. 6). To the extent that any nodes 204 of simulated object 120 were displaced by the interaction of simulated tool component 122 and simulated object 120, these nodes 204 become the block 310 originally displaced nodes for the purposes of implementing method 300.

In some cases, a user will move simulated tool component 122 across the boundary between current contact face 504 and a neighboring face 208. Control unit 118 detects this change in current contact face 504 in block 540 of method 500 (FIG. 10A). When a change in the current contact face 504 is detected in block 540, control unit 118 discontinues method 600 (if necessary) and commences a new method 600 using the updated current contact face 504. When a new method 600 is commenced because of a change in current contact face 504, nodes 204 of the previous current contact face may be allowed to move freely again (i.e. the nodes 204 of the previous current contact face need not be constrained in the block 640 displacement propagation loop). For example, in the sticky node interaction technique, the sticky node 204* is constrained from movement in the block 640 displacement propagation loop. However, a change in current contact face 504 may cause a corresponding change in sticky node 204*. Accordingly, after a change in sticky node 204*, the previous sticky node may move as any other node 204 in subsequent method 600 operations/iterations. It will be appreciated that a change in current contact face 504 is not necessarily accompanied by a change in the current contact node 204*. In the shrink face and push face interaction techniques, all three nodes 204 of current contact face 504 are constrained from movement in the block 640 displacement propagation loop. A change in current contact face 504 will cause at least one of these nodes 204 to become unconstrained in subsequent method 600 operations.

As discussed above, control unit 118 may detect a change in current contact face 504 in block 540 of method 500 (FIG. 10A). In some embodiments, the block 540 line-triangle intersection tests may be performed using the home positions of relevant nodes 204 (i.e. the undeformed mesh) rather than the current positions of the relevant nodes 204. For example, in the sticky node and shrink face interaction techniques where simulated tool point 123A is made to be coincident with one or more nodes 204 of current contact face 504, it may be useful for control unit 118 to make the block 540 decision as to whether to change current contact face 504 based on the home positions of the relevant nodes 204 (i.e. the undeformed mesh). In the push face interaction technique where simulated tool point 123A is not made to be coincident with a node 204 of current contact face 504, control unit 118 may make the block 504 decision as to whether to change current contact face 504 based on the current positions of the relevant nodes 204 and/or the home positions of the relevant nodes 204.

As discussed above, block 540 involves performing a line-triangle intersection test on current contact face 504 and its neighboring faces 208. The neighboring faces 208 of a current contact face 504 may be "edge neighbor" faces (i.e. faces 208 that share a common edge with current contact face 504) or "node neighbor" faces (i.e. faces 208 that share a common node with current contact face 504). When current contact face 504 is implemented using face data structure 232 (FIG. 12C) or half-edge face data structure 432 (FIG. 13C), control unit 118 may determine the edge neighbor faces 208 and node neighbor faces 208 using the edge spring pointers 232B, 432B and the node pointers 232C, 432C of current contact face 504. More particularly, control unit 118 may determine edge neighbor faces 208 of current contact face 504 in the following manner:

(i) edge spring pointers 232B, 432B of face data structure 232, 432 corresponding to current contact face 504 point to the three edge spring data structures 234, 434. These three edge spring data structures 234, 434 correspond to the edge springs 206' which define current contact face 504;

(ii) each of these edge spring data structures 234, 434 includes two face pointers 234C, 434C;

(iii) one of each of these face pointers 234C, 434C will point to current contact face 504 and the other one of each of these face pointers will point to an edge neighbor face 208 of current contact face 504.

Similarly, node neighbor faces 208 of current contact face 504 may be determined in the following manner:

(i) node pointers 232C, 432C of data structure 232, 432 corresponding to current contact face 504 point to the three node data structures 236, 436. These three node data structures 236, 436 correspond to the nodes 204 which define current contact face 504;

(ii) each of these node data structures 236, 436 will have one or more face pointers 236F, 436F;

(iii) one of these face pointers 236F, 436F will point to current contact face 504 and any other ones of these face pointers will point to node neighbor faces 208 of current contact face 504.

The above-described interaction between simulated tool component 122 and simulated object 120 assumes that simulated tool component 122 is a blunt tool that deforms the mesh corresponding to simulated object 120, but does not "cut" simulated object 120. In some applications, such as for modeling surgical environments for example, it is desirable to simulate tool components 122 that may be cutting tools. Non-limiting examples of such cutting tools include scalpels and cauterizing tools. Particular embodiments of the invention incorporate methods for modeling the use of cutting tools by modifying the meshes used to define simulated objects 120. These methods incorporate many of the techniques and aspects described above for blunt tools.

A simulated cutting tool component 122 may contact the mesh, deform the mesh and move in relation to the mesh in the same manner as the simulated blunt tool component 122 discussed above. In some embodiments, the decision to cut a simulated object 120 is made on the basis of whether simulated cutting tool component 122 contacts simulated object 120 with sufficient force. This decision as to whether to cut simulated object 120 may be based on a "cutting force threshold". By way of non-limiting example, control unit 118 may evaluate the block 650 haptic feedback force and/or the normal component of the block 650 haptic feedback force and if this force is greater than a certain cutting force threshold, control unit 118 may decide that simulated object 120 should be cut. In some embodiments, the cutting force threshold may be a characteristic of the mesh that represents a simulated object 120 and may be stored in mesh data structure 230 (FIG. 11), for example. In some embodiments, after a decision is made to commence cutting (e.g. the block 650 haptic feedback force is greater than the cutting force threshold), then the haptic feedback force applied in block 655 may be reduced (e.g. by some suitable offset value or scaling factor or the like) to model the effect of the cut being made.

A "start-cut face" 700 is defined to be the first face 208 of a simulated object 120 that is cut by a simulated cutting tool component 122 (i.e. the first current contact face 504 where a decision is made to cut simulated object 120). In accordance with a particular embodiment, the cutting interaction of simulated cutting tool component 122 and simulated object 120 is modeled by changing the mesh used to model simulated object 120 when simulated cutting tool component 122 transitions from start-cut face 700 to a neighbor face. The movement of simulated cutting tool component 122 within start-cut face 700 may deform the mesh in the same manner discussed above and the transition from start-cut face 700 to a neighbor face may be detected in the same manner discussed above.

Figure 18A:
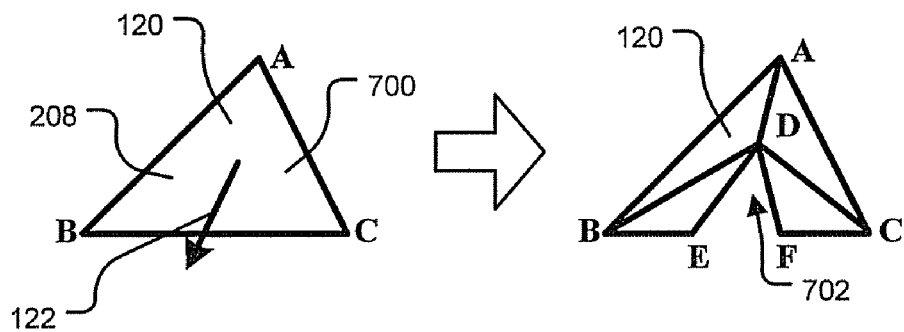
FIGS. 18A and 18B schematically depict possible changes to a mesh when a simulated cutting tool enters a particular face of the mesh.
Figure 18B:
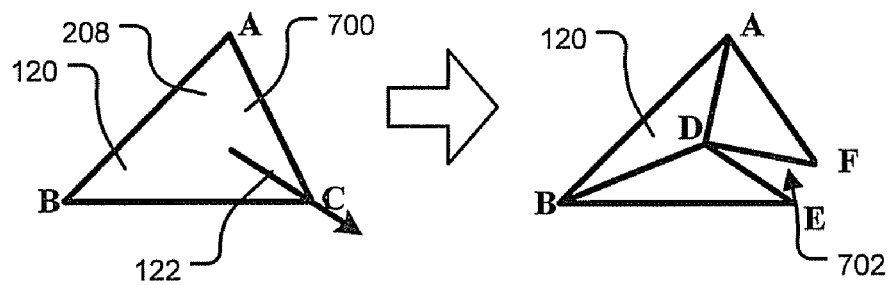

FIGS. 18A and 18B respectively depict the changes to the mesh in accordance with a particular embodiment for the cases where simulated cutting tool component 122 transitions from start-cut face 700 to a neighbor face (not explicitly shown) through an edge of start-cut face 700 and where simulated cutting tool component 122 transitions from start-cut face 700 to a neighbor face through a node of start-cut face 700. If simulated cutting tool component 122 transitions from start-cut face 700 via an edge (e.g. edge BC in FIG. 18A), then start-cut face 700 is subdivided into a plurality (e.g. four) of new faces. In the illustrated embodiment: the new faces include: face BED, face DAB, face CAD and face FCD. New nodes D, E and F and new edge springs BE, BD, DE, DF, CD and CF are also created. New home springs 212 (not shown) may also be created for each of the new nodes D, E and F. The home positions 204' of newly created nodes D, E and F may be the initial positions of these newly created nodes D, E and F when these new nodes are created.

New node D may be originally be located at the point where the decision is made to start cutting start cut face 700 (e.g. the location of simulated tool point 123A (or tool-mesh interaction point 506) when sufficient force is applied to simulated cutting tool component 122 to overcome the cutting force threshold. New nodes E and F may originally be located at the location where simulated tool point 123A (or tool-mesh intersection point 506) transitions from start-cut face 700 to the neighbor face. However, once the new nodes, faces and springs are added to the mesh, control unit 118 may allow the mesh to deform (e.g. by executing deformation method 300 with the new nodes D, E and F as the block 310 originally displaced nodes). This deformation will cause new nodes E and F to pull apart from one another as shown in FIG. 18A to simulate a cut 702.

FIG. 18B depicts the changes to the mesh in accordance with a particular embodiment for the case where simulated cutting tool component 122 transitions from start-cut face 700 to a neighbor face through node C of start-cut face 700. In many respects, the technique of FIG. 18B is similar to the technique of FIG. 18A. Original node C is divided into a pair of new nodes E and F and a new node D is created at the location where the decision is made to start cutting start cut face 700. Also created are new faces BED, BDA and ADF and new edge springs BD, BE, ED, DF, DA and AF. Allowing the mesh to deform causes new nodes E and F to pull apart from one another as shown in FIG. 18B to simulate a cut 702.

We also define a "end-cut face" 704 to be the last face 208 of a simulated object 120 that is contacted by a simulated cutting tool component 122 before a decision is made to discontinue cutting simulated object 120. In one particular embodiment, the decision is made to discontinue cutting simulated object 120 when the force between simulated cutting tool component 122 and simulated object 120 falls below the cutting force threshold. By way of non-limiting example, control unit 118 may evaluate the block 650 haptic feedback force and if this force is less than the cutting force threshold, control unit 118 may decide that the cutting of simulated object 120 should be discontinued.

Figure 18C:
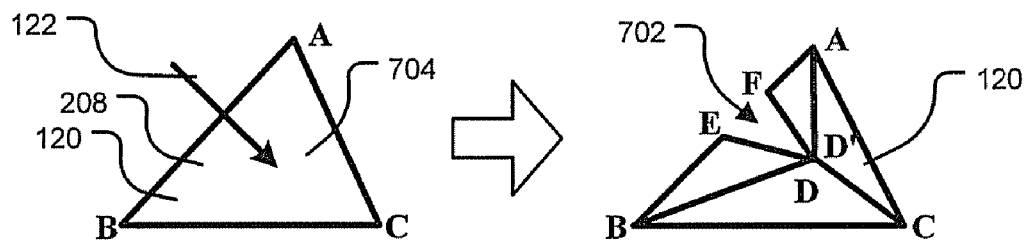
FIGS. 18C and 18D schematically depict possible changes to a mesh when a simulated cutting tool is withdrawn from a particular face of the mesh.
Figure 18D:
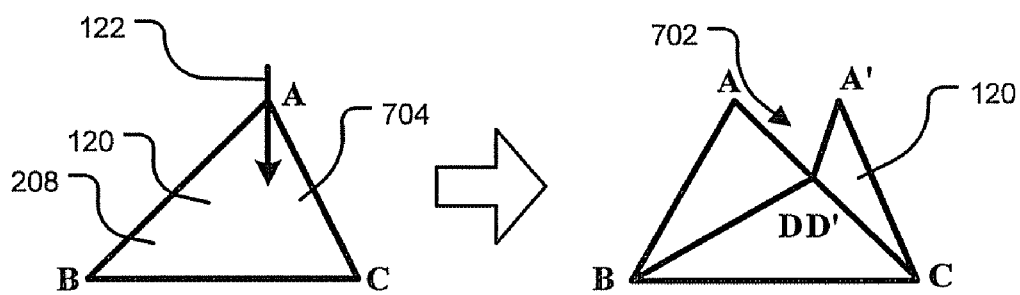

FIGS. 18C and 18D respectively depict the changes to the mesh in accordance with a particular embodiment for the cases where simulated cutting tool component 122 transitions into end-cut face 704 from a neighbor face (not explicitly shown) through an edge of end-cut face 704 and where simulated cutting tool component 122 transitions into end-cut face 704 from a neighbor face through a node of end-cut face 704. In particular embodiments, each time that simulated cutting tool 122 transitions into a new face 208, it is assumed (at least initially) that the new face 208 is end-cut face 704.

As shown in FIG. 18C, for the case where simulated cutting tool component 122 transitions into end-cut face 704 from a neighbor face through an edge (edge AB in the illustrated example), new nodes E and F are created at the location where simulated tool point 123A (or tool-mesh intersection point 506) first contacts end-cut face 704. A pair of new nodes D and D' are also created at the current location of simulated tool point 123A (or tool-mesh intersection point 506). As explained in more detail below, the pair of nodes D and D' are used to simplify later subdivision for the case where the original assumption (i.e. that face ABC is a end-cut face 704) turns out to be false. Nodes D and D' are bound together if it is determined conclusively that face ABC is an end-cut face 704, but, as explained in more detail below, nodes D, D' may be separated if it is later determined that face ABC is not an end cut face 704. Also created are new faces BDE, BCD, CAD and FDA and new edge springs BE, ED, BD, FD, DA and AF. Allowing the mesh to deform causes new nodes E and F to pull apart from one another as shown in FIG. 18C to simulate a cut 702.

FIG. 18D depicts the case where simulated cutting tool component 122 transitions into end-cut face 704 from a neighbor face through a node (node A in the illustrated example). New nodes A and A' are created at the location where simulated tool point 123A (or tool-mesh intersection point 506) first contacts end-cut face 704. A pair of new nodes D and D' are also created at the current location of simulated tool point 123A (or tool-mesh intersection point 506). Nodes D and D' are bound together if it is determined conclusively that face ABC is an end-cut face 704, but, as explained in more detail below, nodes D, D' may be separated if it is later determined that face ABC is not an end cut face 704. Also created are new faces BDA, CDB and DCA' and new edge springs AD, BD, CD, A'D, CA' and BA. Allowing the mesh to deform causes new nodes A and A' to pull apart from one another as shown in FIG. 18D to simulate a cut 702.

In some cases, simulated cutting tool 122 transitions both into and out of a face 208 while the decision to cut simulated object 120 remains positive. In this case, face 208 may be referred to as an "intermediate-cut face" 706. As discussed above, each time that simulated cutting tool component 122 transitions into a particular face 208, it may be assumed (at least initially) that the particular face 208 is an end-cut face 704. Accordingly, cutting of a particular face 208 may initially be modeled according to the technique of FIG. 18C or 18D depending on whether simulated cutting tool component 122 transitions into the particular face 208 via an edge (FIG. 18C) or a node (FIG. 18D). When control unit 118 determines that simulated cutting tool component 122 has transitioned out of the particular face 208 and into a neighboring face while the decision to cut simulated object 120 remains positive, then it is known that the particular face 208 is actually an intermediate-cut face 706 and not an end-cut face 704. In one particular embodiment, modification of an assumed end-cut face 704 into an intermediate-cut face 706 is accomplished by deleting one or two of the faces of the assumed end-cut face 704. The exact nature of these modifications depends on where simulated cutting tool component 122 transitions into and out of intermediate-cut face 706.

Figure 19A:
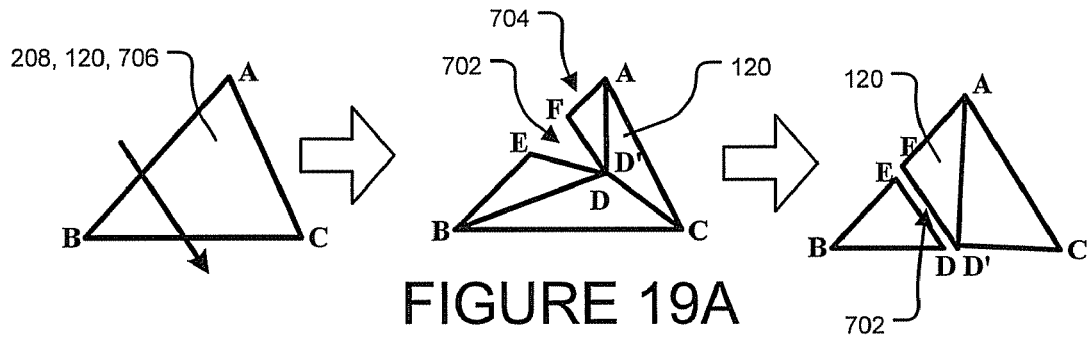
FIGS. 19A-19H schematically depict possible changes to a mesh when a simulated cutting tool transitions into and out of a particular face of the mesh while maintaining contact with the mesh.
Figure 19B:
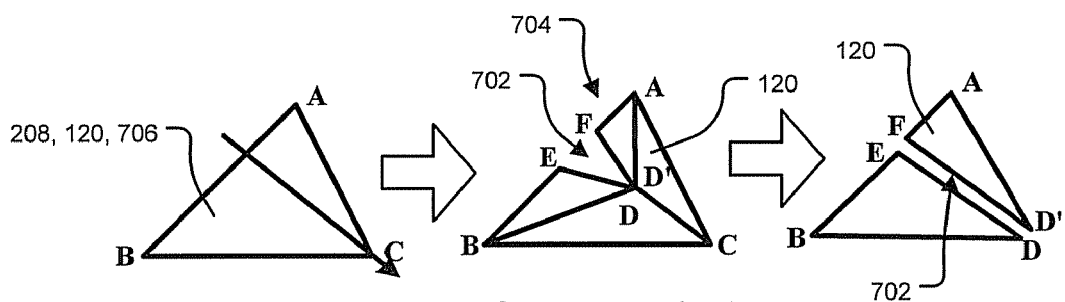
Figure 19C:
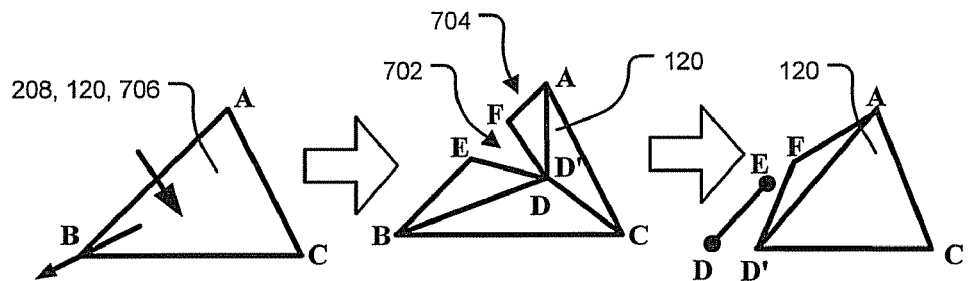
Figure 19D:
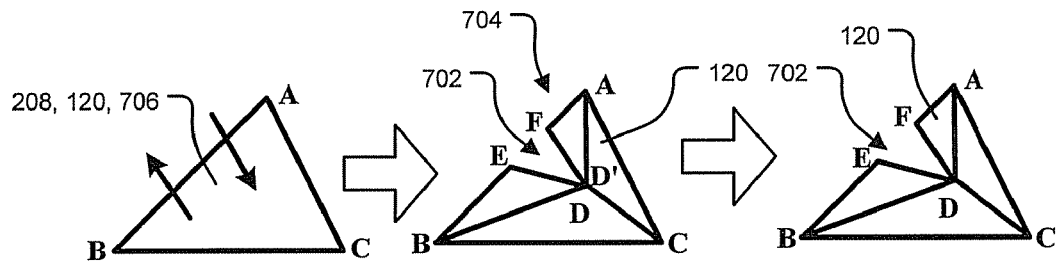
Figure 19E:
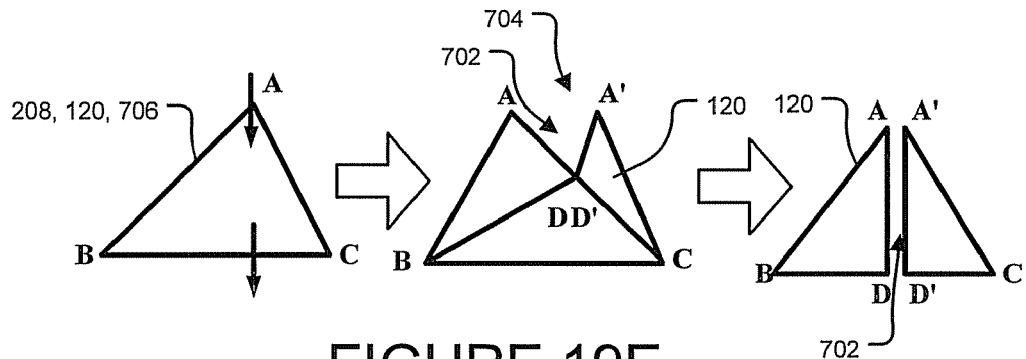

FIGS. 19A-19D depict the four cases where simulated cutting tool component 122 transitions into intermediate-cut face 706 through an ingress edge AB and then transitions out of intermediate-cut face 706 through: a different edge BC (FIG. 19A); a node C different from the nodes A, B that define the ingress edge AB (FIG. 19B); a node B which is one of the nodes A, B that define the ingress edge AB (FIG. 19C); and the same ingress edge AB (FIG. 19D). In each case shown in FIGS. 19A-19D, where simulated cutting tool component 122 transitions into intermediate-cut face 706 through an ingress edge AB, it is first assumed that face ABC is an end-cut face 704 similar to that of FIG. 18C.

When simulated cutting tool component 122 transitions out of intermediate-cut face 706 through a different edge BC (FIG. 19A), newly created nodes D, D' are uncoupled from one another and face BDC of the assumed end-cut face 704 is deleted to provide a cut 702 which divides intermediate-cut face 706 to form three resultant faces BDE, D'AF and D'CA. When simulated cutting tool component 122 transitions out of intermediate-cut face 706 though a node C that is different from the nodes A, B that define the ingress edge AB (FIG. 19B), newly created nodes D, D' are uncoupled from one another and faces CDB and AD'C of the assumed end-cut face 704 are deleted to provide a cut 702 which divides intermediate-cut face 706 to form two resultant faces DEB and D'AF.

When simulated cutting tool component 122 transitions out of intermediate-cut face 706 through a node B that is one of the nodes A, B that define ingress edge AB (FIG. 19C), newly created nodes D, D' are uncoupled from one another, face DEB of the assumed end-cut face 704 is deleted and edge DE may replace edge BE in a neighboring face (not explicitly shown). As shown in FIG. 19C, the result in this circumstance is that cut 702 divides intermediate-cut face 706 from its neighboring face along new edge DE and that a pair of resultant faces CAD' and AFD' are formed from intermediate-cut face 706. In some embodiments, new edge DE need not explicitly replace edge BE and both edges BE and DE may be maintained by control unit 118. In such embodiments, one of edges BE and DE may be redundant. As shown in FIG. 19D, when simulated cutting tool component 122 transitions out of intermediate-cut face 706 through the same edge AB as the ingress edge AB, newly created nodes D, D' are collapsed into a single node D and the result is somewhat similar to that of start-cut face 702 of FIG. 18A.

Figure 19F:
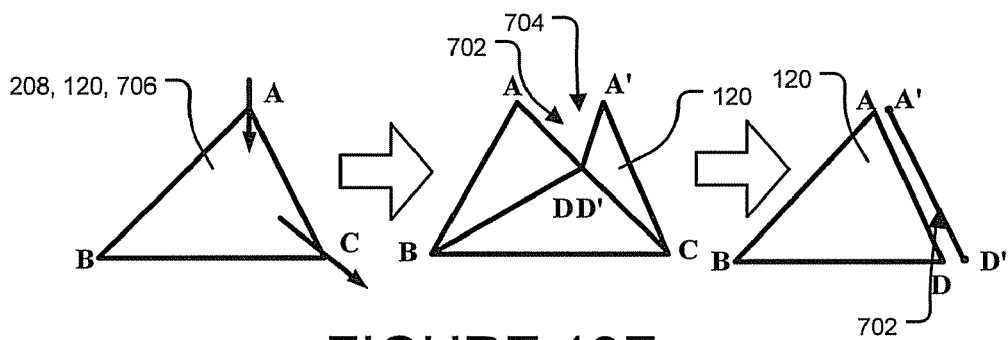
Figure 19G:
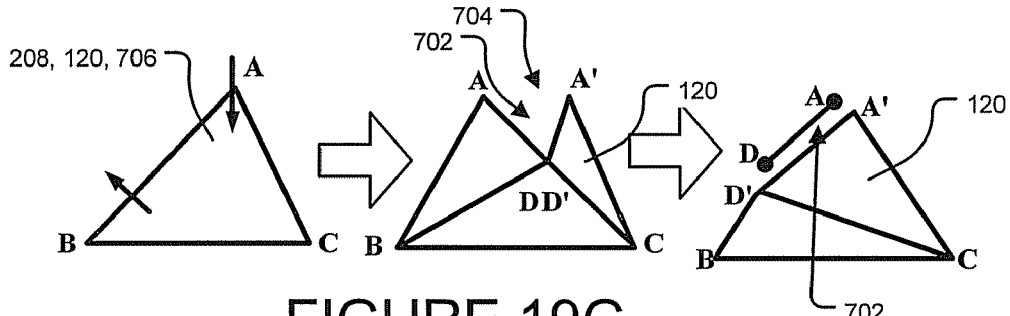
Figure 19H:
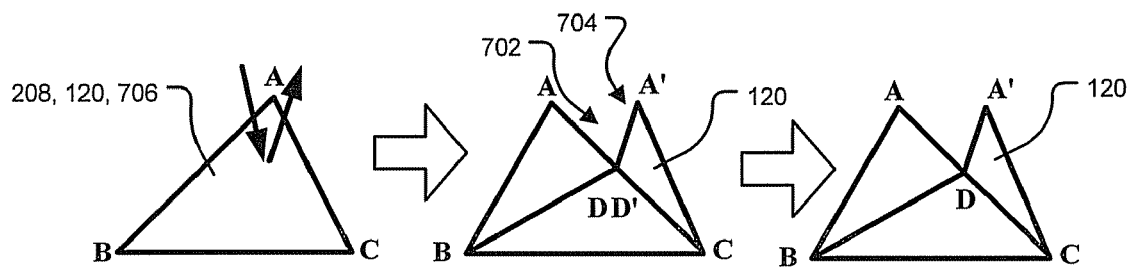

FIGS. 19E-19H depict the four cases where simulated cutting tool component 122 transitions into intermediate-cut face 706 through an ingress node A and then transitions out of intermediate-cut face 706 through: an edge BC that is not defined by ingress node A (FIG. 19E); a node C that is different from ingress node A (FIG. 19F); an edge AB that is defined in part by ingress node A (FIG. 19G); and the same ingress node A (FIG. 19H). In each case shown in FIGS. 19E-19H, where simulated cutting tool component 122 transitions into intermediate-cut face 706 through an ingress node A, it is first assumed that the face is an end-cut face 704 similar to that of FIG. 18D.

When simulated cutting tool component 122 transitions out of intermediate-cut face 706 through an edge BC that is not defined by ingress node A (FIG. 19E), newly created nodes D, D' are uncoupled from one another and face CDB of the assumed end-cut face 704 is deleted to provide a cut 702 which divides intermediate-cut face 706 to form two resultant faces BDA and D'CA'. When simulated cutting tool component 122 transitions out of intermediate-cut face 706 though a node C that is different from ingress node A (FIG. 19F), newly created nodes D, D' are uncoupled from one another, face CA'D' of the assumed end-cut face 704 is deleted and edge A'D' may replace edge A° C. in a neighboring face (not explicitly shown). As shown in FIG. 19F, the result in this circumstance is that cut 702 divides intermediate-cut face 706 from its neighboring face along new edge D'A' and intermediate-cut face 706 becomes face BDA. In some embodiments, new edge D'A' need not explicitly replace edge A'C and both edges D'A' and A'C may be maintained by control unit 118. In such embodiments, one of edges D'A' and A'C may be redundant.

When simulated cutting tool component 122 transitions out of intermediate-cut face 706 through an edge AB that is defined in part by ingress node A (FIG. 19G), newly created nodes D, D' are uncoupled from one another, face ABD of the assumed end-cut face 704 is deleted and edges AD and BD' are created in the neighboring face to which simulated cutting tool component 122 transitions (not explicitly shown). New edges AD and BD' may be similar to the new edges created when simulated cutting tool component 122 transitions into a new face through an edge (i.e. see edges BE and AF of FIG. 18C). As shown in FIG. 19G, the result in this circumstance is that cut 702 divides intermediate-cut face 706 from its neighboring face along new edge DA and intermediate-cut face 706 becomes a pair of faces BCD' and A'D'C. When simulated cutting tool component 122 transitions out of intermediate-cut face 706 through the same node A as ingress node A (FIG. 19H), newly created nodes D, D' are collapsed into a single node D and the result is somewhat similar to that of start-cut face 702 of FIG. 18B.

Certain implementations of the invention comprise computer processors which execute software instructions which cause the processors to perform a method of the invention. For example, one or more processors in a system may implement data processing steps in the methods described herein by executing software instructions retrieved from a program memory accessible to the processors. The invention may also be provided in the form of a program product. The program product may comprise any processor-readable medium which carries a set of processor-readable instructions which, when executed by a data processor, cause the data processor to execute a method of the invention. Program products according to the invention may be in any of a wide variety of forms. The program product may comprise, for example, physical media such as magnetic data storage media including floppy diskettes, hard disk drives, optical data storage media including CD ROMs, DVDs, electronic data storage media including ROMs, flash RAM, or the like. The instructions may be present on the program product in encrypted and/or compressed formats.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (i.e. that is functionally equivalent), including components which are not structurally equivalent to the disclosed structure which performs the function in the illustrated exemplary embodiments of the invention.

As will be apparent to those skilled in the art in the light of the foregoing disclosure, many alterations and modifications are possible in the practice of this invention without departing from the spirit or scope thereof. For example:

The methods described above represent particular embodiments of the invention. In many cases, the order of certain blocks may be changed in the methods presented above while achieving the same or similar result. By way of non-limiting example, it will be appreciated that in embodiments where the block 360 decision is made on the basis of the net resultant force vectors determined in block 340, then the block 360 determination may precede block 350 so as to avoid having to compute displacements unnecessarily. As another non-limiting example, method 600 describes a procedure where displacement propagation loop 640 is performed completely in each iteration of method 600. This is not necessary. In some embodiments, only a single loop of displacement propagation is performed on each iteration of method 600. In such embodiments, only the level-one-connected nodes of the block 610 sticky node(s) are moved in the first iteration of method 600 and the level 1 and level-two-connected nodes are moved in the second iteration of method 600, etc.

In the illustrated embodiments discussed above, the force between nodes is modeled as a damped spring in accordance with a modified version of Hooke's law (equation (1)). This is not necessary. In other embodiments, the force between nodes can be based on a different relationship. In particular embodiments, this relationship is a function of the distance and/or direction between nodes. In one particular embodiment, the force between nodes may be based at least in part on a function of a higher power of the distance between the nodes (e.g. on a function of the distance between the nodes squared). These alternative forces may be used in the place of equation (1) in calculating the forces on nodes 204 and the resultant displacement propagation.

It will be appreciated that block 540 of method depends on the ability of control unit 118 to determine the neighbors of a previous current contact node/face 504. The adjacency information maintained in the data structures discussed above is suitable for this purpose. However, in other embodiments, where this adjacency information is not available, blocks 510 and 540 may be removed from method 500 and method 500 may involve performing the procedures of blocks 520 and 530 for each iteration. The data structure made up of an index array and a pair of node arrays is suitable for this purpose.

In some embodiments, additional springs may be provided between different meshes (e.g. between different simulated objects). These springs may be referred to as "mesh-connecting springs" and may be similar to the home springs described above except that their rest length ($L_R$) value may not be zero. These mesh-connecting springs may be used to simulate objects having interior structures using multiple surface meshes interconnected by mesh-connecting springs. For example, an organ of a patient could be simulated by multiple nested surface meshes interconnected by mesh-connecting springs.

In some embodiments, other properties 232D, 432D of face data structures 232 and half-edge face data structures 432 may include coefficient of friction data. Such coefficients of friction may be used to provide additional haptic feedback when a simulated tool component 122 is in contact with a simulated object 120 and is moving in relation to the simulated object 120 while maintaining contact therewith (e.g. when simulated tool component 122 is sliding across a surface of simulated object 120).

It will be appreciated that many of the above-described methods may be implemented using a full spring data structure (FIGS. 12A-12C) or a half-edge spring data structure (FIGS. 8A, 8B, 9A, 9B and/or 13A-13C).

In some embodiments, where the mesh is implemented in one of the half-spring data structures described above, half-springs having one orientation may be used to implement the displacement of nodes under the influence of a simulated tool and half-springs having the opposing direction may be used for the purposes of determining haptic feedback. By way of non-limiting example, particular springs may be used to implement the displacement of nodes under the influence of a simulated tool and return springs having the opposing direction may be used for the purposes of determining haptic feedback (see FIGS. 8A, 8B).

What is claimed is:

1. A method for simulating interaction between a tool and an object, the method comprising:
providing a tool model for simulating the tool in a simulated environment;
providing a mesh for simulating an object in the simulated environment, the mesh comprising a plurality of nodes and a plurality of first force functions between pairs of nodes, each first force function being a function of a distance between its corresponding pair of nodes;

deforming the mesh in response to interaction between the tool model and the mesh in the simulated environment, wherein deforming the mesh comprises:
displacing one or more initially displaced nodes,
displacing one or more level-one-connected nodes, displacement of each level-one-connected node dependent on at least one first force function between the level-one-connected node and a corresponding one of the one or more initially displaced nodes,
iteratively displacing one or more level-n-connected nodes, displacement of each level-n-connected node dependent on at least one first force function between the level-n-connected node and a corresponding one of the one or more level n−1 connected nodes, where n=2 in a first iteration and increases by one with each iteration, and
on each iteration, for each level-n-connected node evaluating one or more displacement propagation conditions and discontinuing iterative displacement for nodes which do not satisfy the displacement propagation conditions.

2. A method according to claim 1 wherein the mesh comprises a home position and a home force function for each node, each home force function being a function of a distance between a current location of its corresponding node and the home position of its corresponding node.

3. A method according to claim 2 wherein the displacement of each level-one-connected node is dependent on the home force function of the level-one-connected node and the displacement of each level-n-connected node is dependent on the home force function of the level-n-connected node.

4. A method according to claim 2 comprising:
determining a haptic feedback force, the haptic feedback force dependent on: one or more first force functions between the one or more initially displaced nodes and the one or more level-one-connected nodes; and the one or more home force functions corresponding to the one or more initially displaced nodes; and
applying the haptic feedback force to the tool such that the haptic feedback force is experienced by a user of the tool.

5. A method according to claim 4 wherein applying the haptic feedback force to the tool comprises causing at least one of: one or more actuators to resist movement of the tool and one or more actuators to move the tool.

6. A method according to claim 1 wherein each first force function comprises a term which is proportional, with a proportionality constant $k_s$, to a difference between the distance between its corresponding pair of nodes and a constant rest length parameter $L_R$.

7. A method according to claim 6 wherein each first force function comprises a term which is proportional, with a proportionality constant $k_d$, to a difference between the distance between its corresponding pair of nodes and a distance between its corresponding pair of nodes in a previous iteration.

8. A method according to claim 7 wherein the proportionality constants $k_s$ and $k_d$ are selected such that displacing the one or more level-one-connected nodes and displacing the one or more level-n-connected nodes exhibit overdamped behavior.

9. A method according to claim 1 wherein the mesh comprises a plurality of second force functions between the pairs of nodes, each second force function being a function of the distance between its corresponding pair of nodes.

10. A method according to claim 9 wherein the first and second force functions between each particular pair of nodes are vector functions having opposing directions.

11. A method according to claim 10 wherein the displacement of each level-one-connected node is dependent on a corresponding second force function between the level-one-connected node and one of the one or more initially displaced nodes and the displacement of each level-n-connected node is dependent on a corresponding second force function between the level-n-connected node and one of the one or more level n−1 connected nodes.

12. A method according to claim 10 comprising:
determining a haptic feedback force, the haptic feedback force dependent on the one or more second force functions between the one or more initially displaced nodes and the one or more level-one-connected nodes; and
applying the haptic feedback force to the tool such that the haptic feedback force is experienced by a user of the tool.

13. A method according to claim 12 wherein the haptic feedback force is determined independently of the first force functions between the one or more initially displaced nodes and the one or more level-one-connected nodes.

14. A method according to claim 12 wherein applying the haptic feedback force to the tool comprises causing at least one of: one or more actuators to resist movement of the tool and one or more actuators to move the tool.

15. A method according to claim 12 wherein the mesh comprises a home position and a home force function for each node, each home force function being a function of a distance between a current location of its corresponding node and the home position of its corresponding node.

16. A method according to claim 15 wherein the haptic feedback force is further dependent on the one or more home force functions corresponding to the one or more initially displaced nodes.

17. A method according to claim 1 wherein the mesh comprises a plurality of faces, each face defined by a corresponding plurality of face-defining nodes from among the plurality of nodes in the mesh and by a corresponding plurality of edges, each edge defined between a corresponding edge-defining pair of the face-defining nodes and each edge associated with a corresponding first force function defined between the corresponding edge-defining pair of nodes.

18. A method according to claim 17 wherein each face is a triangle defined by a corresponding triplet of face-defining nodes and three first force functions associated with three edges of the triangle.

19. A method according to claim 1 comprising:
determining a haptic feedback force, the haptic feedback force dependent on one or more first force functions between the one or more initially displaced nodes and the one or more level-one-connected nodes; and
applying the haptic feedback force to the tool such that the haptic feedback force is experienced by a user of the tool.

20. A method according to claim 19 wherein applying the haptic feedback force to the tool comprises causing at least one of: one or more actuators to resist movement of the tool and one or more actuators to move the tool.

21. A method according to claim 1 wherein, for each node, the displacement propagation condition comprises a threshold condition, the threshold condition comprising a net force value experienced by the node being greater than a threshold net force value.

22. A method according to claim 1 wherein, for each node, the displacement propagation condition comprises a threshold condition, the threshold condition comprising a determined displacement for the node being greater than a threshold displacement value.

23. A method according to claim 1 wherein, for each node, the displacement propagation condition comprises a threshold condition, the threshold condition comprising a threshold level of connectedness of the node to the one or more originally displaced nodes being less than a threshold level of connectedness.

24. A method for simulating interaction between a tool and an object, the method comprising:
providing a tool model for simulating the tool in a simulated environment;
providing a mesh for simulating an object in the simulated environment, the mesh comprising a plurality of nodes and a plurality of first force functions between pairs of nodes, each first force function being a function of a distance between its corresponding pair of nodes;
deforming the mesh in response to interaction between the tool model and the mesh in the simulated environment, wherein deforming the mesh comprises:
displacing one or more initially displaced nodes; and
displacing one or more level-one-connected nodes, displacement of each level-one-connected node dependent on at least one first force function between the level-one-connected node and a corresponding one of the one or more initially displaced nodes,
iteratively displacing one or more level-n-connected nodes, displacement of each level-n-connected node dependent on at least one first force function between the level-n-connected node and a corresponding one of the one or more level n−1 connected nodes, where n=2 in a first iteration and increases by one with each iteration, and
on each iteration, evaluating one or more displacement propagation conditions and discontinuing iterative displacement for nodes which do not satisfy the displacement propagation conditions, and
wherein, for each node, the displacement propagation condition comprises a threshold condition, the threshold condition comprising at least one of: a net force value experienced by the node being greater than a threshold net force value; a determined displacement for the node being greater than a threshold displacement value; and a threshold level of connectedness of the node to the one or more originally displaced nodes being less than a threshold level of connectedness.

25. A method for simulating interaction between a tool and an object, the method comprising:
providing a tool model for simulating the tool in a simulated environment;
providing a mesh for simulating an object in the simulated environment, the mesh comprising a plurality of nodes and a plurality of first force functions between pairs of nodes, each first force function being a function of a distance between its corresponding pair of nodes;
deforming the mesh in response to interaction between the tool model and the mesh in the simulated environment, wherein deforming the mesh comprises:
displacing one or more initially displaced nodes,
displacing one or more level-one-connected nodes, displacement of each level-one-connected node dependent on at least one first force function between the level-one-connected node and a corresponding one of the one or more initially displaced nodes, and
iteratively displacing one or more level-n-connected nodes, displacement of each level-n-connected node dependent on at least one first force function between the level-n-connected node and a corresponding one of the one or more level n−1 connected nodes, where n=2 in a first iteration and increases by one with each iteration,
wherein the mesh comprises a plurality of faces, each face defined by a corresponding plurality of face-defining nodes from among the plurality of nodes in the mesh and by a corresponding plurality of edges, each edge defined between a corresponding edge-defining pair of the face-defining nodes and each edge associated with a corresponding first force function defined between the corresponding edge-defining pair of nodes, and
wherein the method comprises maintaining a face data structure for each face in the mesh, each face data structure comprising pointers to each of its corresponding plurality of face-defining nodes and pointers to each of the first force functions associated with its corresponding plurality of edges.

26. A method according to claim 25 comprising maintaining a force function data structure for each first force function in the mesh, each force function data structure comprising: one or more parameters which define the first force function; pointers to each of the edge-defining pair of nodes between which the first force function is defined; and pointers to one face or two faces that are defined in part by the edge-defining pair of nodes between which the first force function is defined.

27. A method according to claim 25 comprising maintaining a node data structure for each node in the mesh, each node data structure comprising: a current node position; pointers to one or more faces which are defined in part by the node; and pointers to one or more first force functions for which the node is one of the edge-defining pair of nodes between which the one or more first force functions are defined.

28. A method according to claim 25 wherein the tool model defines the location of the tool in the simulated environment and wherein the tool model comprises at least one simulated tool point and at least one simulated tool axis, the simulated tool point located on the simulated tool axis.

29. A method according to claim 28 wherein deforming the mesh in response to interaction between the tool model and the mesh comprises determining that the simulated tool axis has intersected with a current contact face from among the plurality of faces and selecting a sticky node from among the face-defining nodes of the current contact face and wherein displacing the one or more initially displaced nodes comprises moving the sticky node toward the simulated tool point.

30. A method according to claim 29 wherein moving the sticky node toward the simulated tool point comprises moving the sticky node by an amount dependent on one or more first force functions between the sticky node and one or more of the level-one-connected nodes.

31. A method according to claim 30 wherein moving the sticky node toward the simulated tool point comprises: evaluating a net force based at least in part on a sum of the one or more first force functions between the sticky node and the one or more of the level-one-connected nodes based on an assumption that the sticky node is located at the simulated tool point; inverting the net force; determining a displacement of the sticky node from its current location based on the inverted net force; and applying the determined displacement to the sticky node to obtain an updated location of the sticky node.

32. A method according to claim 31 comprising repeating deforming the mesh until the updated location of the sticky node reaches a threshold vicinity of the simulated tool point.

33. A method according to claim 31 wherein the mesh comprises a home position and a home force function for each node, each home force function being a function of a distance between a current location of its corresponding node and the home position of its corresponding node and wherein evaluating the net force is based at least in part on a sum of the one or more first force functions between the sticky node and the one or more of the level-one-connected nodes and the home force function of the sticky node based on an assumption that the sticky node is located at the simulated tool point.

34. A method according to claim 33 comprising:
determining a haptic feedback force based at least in part on a sum of: the one or more first force functions between the sticky node and the one or more of the level-one-connected nodes based on an assumption that the sticky node is located at the updated location of the sticky node; and the home force function of the sticky node based on the assumption that the sticky node is located at the updated location of the sticky node; and
applying the haptic feedback force to the tool such that the haptic feedback force is experienced by a user of the tool.

35. A method according to claim 31 comprising:
determining a haptic feedback force based at least in part on a sum of the one or more first force functions between the sticky node and the one or more of the level-one-connected nodes based on an assumption that the sticky node is located at the updated location of the sticky node; and
applying the haptic feedback force to the tool such that the haptic feedback force is experienced by a user of the tool.

36. A method according to claim 28 wherein deforming the mesh in response to interaction between the tool model and the mesh comprises determining that the simulated tool axis has intersected with a current contact face from among the plurality of faces and selecting a plurality of sticky nodes from among the face-defining nodes of the current contact face and wherein displacing the one or more initially displaced nodes comprises moving the plurality of sticky nodes toward the simulated tool point.

37. A method according to claim 36 wherein moving the plurality of sticky nodes toward the simulated tool point comprises, for each of the plurality of sticky nodes, moving the sticky node by a corresponding amount dependent on one or more first force functions between the sticky node and one or more of the level-one-connected nodes.

38. A method according to claim 37 wherein, for each of the plurality of sticky nodes, moving the sticky node toward the simulated tool point comprises: evaluating a net force based at least in part on a sum of the one or more first force functions between the sticky node and the one or more of the level-one-connected nodes based on an assumption that the sticky node is located at the simulated tool point; inverting the net force; determining a displacement of the sticky node from its current location based on the inverted net force; and applying the determined displacement to the sticky node to obtain an updated location of the sticky node.

39. A method according to claim 38 comprising repeating deforming the mesh until the updated locations of the plurality of sticky nodes reach a threshold vicinity of the simulated tool point.

40. A method according to claim 38 wherein the plurality of sticky nodes comprises all of the face-defining nodes of the current contact face.

41. A method according to claim 38 wherein the mesh comprises a home position and a home force function for each node, each home force function being a function of a distance between a current location of its corresponding node and the home position of its corresponding node and wherein, for each of the plurality of sticky nodes, evaluating the net force is based at least in part on a sum of the one or more first force functions between the sticky node and the one or more of the level-one-connected nodes and the home force function of the sticky node based on an assumption that the sticky node is located at the simulated tool point.

42. A method according to claim 41 comprising:
determining a haptic feedback force based at least in part on a sum of: the first force functions between the sticky nodes and the one or more of the level-one-connected nodes based on an assumption that the sticky nodes are located at their updated locations; and the home force functions of the sticky nodes based on the assumption that the sticky nodes are located at their updated locations; and
applying the haptic feedback force to the tool such that the haptic feedback force is experienced by a user of the tool.

43. A method according to claim 38 comprising:
determining a haptic feedback force based at least in part on a sum of the first force functions between the sticky nodes and the one or more of the level-one-connected nodes based on an assumption that the sticky nodes are located at their updated locations; and
applying the haptic feedback force to the tool such that the haptic feedback force is experienced by a user of the tool.

44. A method according to claim 28 wherein deforming the mesh in response to interaction between the tool model and the mesh comprises determining that the simulated tool axis has intersected with a current contact face from among the plurality of faces and selecting a plurality of selected nodes from among the face-defining nodes of the current contact face and wherein displacing the one or more initially displaced nodes comprises moving the plurality of selected nodes toward a corresponding plurality of desired node positions such that, when the selected nodes are in the desired node positions, the simulated tool point is within a threshold distance of the current contact face.

45. A method according to claim 44 wherein moving the selected nodes toward the desired node positions comprises, for each of the plurality of selected nodes, moving the selected node by a corresponding amount dependent on one or more first force functions between the selected node and one or more of the level-one-connected nodes.

46. A method according to claim 45 wherein, for each of the plurality of selected nodes, moving the selected node toward the corresponding desired node position comprises: evaluating a net force based at least in part on a sum of the one or more first force functions between the selected node and the one or more of the level-one-connected nodes based on an assumption that the selected node is located at the corresponding desired node position; inverting the net force; determining a displacement of the selected node from its current location based on the inverted net force; and applying the determined displacement to the selected node to obtain an updated location of the selected node.

47. A method according to claim 46 comprising repeating deforming the mesh until the updated locations of the selected nodes reach threshold vicinities of their corresponding desired node positions.

48. A method according to claim 46 wherein the plurality of selected nodes comprises all of the face-defining nodes of the current contact face.

49. A method according to claim 46 wherein the mesh comprises a home position and a home force function for each node, each home force function being a function of a distance between a current location of its corresponding node and the home position of its corresponding node and wherein, for each of the plurality of selected nodes, evaluating the net force is based at least in part on a sum of the one or more first force functions between the selected node and the one or more of the level-one-connected nodes and the home force function of the selected node based on an assumption that the selected node is located at the corresponding desired node position.

50. A method according to claim 49 comprising:
    determining a haptic feedback force based at least in part on a sum of: the first force functions between the selected nodes and the one or more of the level-one-connected nodes based on an assumption that the selected nodes are located at their updated locations; and the home force functions of the selected nodes based on the assumption that the selected nodes are located at their updated locations; and
    applying the haptic feedback force to the tool such that the haptic feedback force is experienced by a user of the tool.

51. A method according to claim 46 comprising:
    determining a haptic feedback force based at least in part on a sum of the first force functions between the selected nodes and the one or more of the level-one-connected nodes based on an assumption that the selected nodes are located at their updated locations; and
    applying the haptic feedback force to the tool such that the haptic feedback force is experienced by a user of the tool.

52. A method according to claim 28 comprising determining that the simulated tool axis has intersected with a current contact face from among the plurality of faces and simulating cutting the object with the tool, wherein simulating cutting the object with the tool comprises:
    adding a start-cut node to the mesh at a start-cut location on the current contact face;
    tracking a transition location where the simulated tool axis exits the current contact face; and
    adding at least one transition node to the mesh at the transition location.

53. A method according to claim 52 comprising adding one or more new first force functions to the mesh, the one or more new first force functions defined between the start-cut node and the at least one transition node.

54. A method according to claim 53 comprising adding one or more additional first force functions to the mesh, the one or more additional first force functions defined between the start-cut node and one or more of the plurality of nodes and between the at least one transition node and one or more of the plurality of nodes.

55. A method according to claim 54 wherein simulating cutting the object with the tool comprises:
    determining that the simulated tool axis exits the current contact face and intersects a new current contact face at a second transition location;
    adding at least one second transition node at the second transition location;
    tracking a third transition location where the simulated tool axis exits the new current contact face; and
    adding at least one third transition node to the mesh at the third transition location.

56. A method according to claim 55 comprising adding one or more further new first force functions to the mesh, the one or more further new first force functions defined between the at least one second transition node and the at least one third transition node.

57. A method according to claim 56 comprising adding one or more further additional first force functions to the mesh, the one or more further additional first force functions defined between the at least one second transition node and one or more of the plurality of nodes and between the at least one third transition node and one or more of the plurality of nodes.

58. A method according to claim 57 comprising displacing the at least one second transition node and the at least one third transition node, displacement of the at least one second transition node and the at least one third transition node depending on the one or more further new first force functions and the one or more further additional first force functions.

59. A method according to claim 56 comprising displacing the at least one second transition node and the at least one third transition node, displacement of the at least one second transition node and the at least one third transition node depending on the one or more further new first force functions.

60. A method according to claim 54 comprising displacing the start-cut node and the at least one transition node, displacement of the start-cut node and the at least one transition node depending on the one or more new first force functions and the one or more additional first force functions.

61. A method according to claim 53 comprising displacing the start-cut node and the at least one transition node, displacement of the start-cut node and the at least one transition node depending on the one or more new first force functions.

62. A computer program embodied in a non-transitory processor-readable medium for simulating interaction between a tool and an object, the computer program comprising code segments that direct a processor to:
    provide a tool model for simulating the tool in a simulated environment;
    provide a mesh for simulating the object in the simulated environment, the mesh comprising a plurality of nodes and a plurality of first force functions between pairs of nodes, each first force function being a function of a distance between its corresponding pair of nodes;
    deform the mesh in response to interaction between the tool model and the mesh in the simulated environment, wherein deforming the mesh comprises:
    displacing one or more initially displaced nodes,
    displacing one or more level-one-connected nodes, displacement of each level-one-connected node dependent on at least one first force function between the level-one-connected node and a corresponding one of the one or more initially displaced nodes,
    iteratively displacing one or more level-n-connected nodes, displacement of each level-n-connected node dependent on at least one first force function between the level-n-connected node and a corresponding one of the one or more level n−1 connected nodes, where n=2 in a first iteration and increases by one with each iteration, and
    on each iteration, for each level-n-connected node evaluating one or more displacement propagation conditions and discontinuing iterative displacement for nodes which do not satisfy the displacement propagation conditions.

63. A method for simulating interaction between a tool and an object, the method comprising:
    providing a haptic interface component for simulating operation of the tool by allowing the haptic interface component to move in response to force applied by the user and for providing haptic feedback force to the user;

providing a tool model for simulating the tool in a simulated environment, the tool model responsive to movement of the haptic interface component by the user;

providing a mesh for simulating the object in the simulated environment, the mesh comprising a plurality of nodes and a plurality of first force functions between pairs of nodes, each first force function being a function of a distance between its corresponding pair of nodes;

deforming the mesh in response to interaction between the tool model and the mesh in the simulated environment, wherein deforming the mesh comprises:

displacing one or more initially displaced nodes to one or more corresponding updated locations, displacing one or more level-one-connected nodes, displacement of each level-one-connected node dependent on at least one first force function between the level-one-connected node and a corresponding one of the one or more initially displaced nodes, iteratively displacing one or more level-n-connected nodes, displacement of each level-n-connected node dependent on at least one first force function between the level-n-connected node and a corresponding one of the one or more level n−1 connected nodes, where n=2 in a first iteration and increases by one with each iteration, and on each iteration, for each level-n-connected node evaluating one or more displacement propagation conditions and discontinuing iterative displacement for nodes which do not satisfy the displacement propagation conditions; and determining the haptic feedback force, at least in part, on the basis of the one or more corresponding updated locations of the initially displaced nodes and the one or more first force functions between the one or more initially displaced nodes and the one or more level-one-connected nodes; and applying the haptic feedback force to the haptic interface component, such that the haptic feedback force is experienced by the user.

64. A system for simulating interaction between a tool and an object, the system comprising:

a haptic interface component for simulating operation of the tool by allowing the haptic interface component to move in response to force applied by the user;

one or more position sensing systems coupled to the haptic interface component for detecting movement of the haptic interface component;

one or more force-generating systems coupled to the haptic interface component for providing a haptic feedback force to the user via the haptic interface component;

a controller configured to:

provide a tool model for simulating the tool in a simulated environment, the tool model responsive to movement of the haptic interface component detected by the one or more position sensing systems;

provide a mesh for simulating the object in the simulated environment, the mesh comprising a plurality of nodes and a plurality of first force functions between pairs of nodes, each first force function being a function of a distance between its corresponding pair of nodes;

deform the mesh in response to interaction between the tool model and the mesh in the simulated environment, wherein deforming the mesh comprises:

displacing one or more initially displaced nodes to one or more corresponding updated locations, displacing one or more level-one-connected nodes, displacement of each level-one-connected node dependent on at least one first force function between the level-one-connected node and a corresponding one of the one or more initially displaced nodes, iteratively displacing one or more level-n-connected nodes, displacement of each level-n-connected node dependent on at least one first force function between the level-n-connected node and a corresponding one of the one or more level n−1 connected nodes, where n=2 in a first iteration and increases by one with each iteration, and on each iteration, for each level-n-connected node evaluating one or more displacement propagation conditions and discontinuing iterative displacement for nodes which do not satisfy the displacement propagation conditions; and determine the haptic feedback force, at least in part, on the basis of the one or more corresponding updated locations of the initially displaced nodes and the one or more first force functions between the one or more initially displaced nodes and the one or more level-one-connected nodes; and cause the one or more force-generating systems to apply the haptic feedback force to the haptic interface component, such that the haptic feedback force is experienced by a user.

65. A method for simulating cutting an object with a tool, the method comprising:

providing a tool model for simulating the tool in a simulated environment, the tool model defining the location of the tool in the simulated environment and comprising at least one simulated tool point and at least one simulated tool axis, the simulated tool point located on the simulated tool axis;

providing a mesh for simulating the object in the simulated environment, the mesh comprising: a plurality of nodes; a plurality of first force functions between pairs of nodes, each first force function being a function of a distance between its corresponding pair of nodes; and a plurality of faces, each face defined by a corresponding plurality of face-defining nodes from among the plurality of nodes in the mesh and by a corresponding plurality of edges, each edge defined between a corresponding edge-defining pair of the face-defining nodes and each edge associated with a corresponding first force function defined between the corresponding edge-defining pair of nodes;

maintaining a face data structure for each face in the mesh, each face data structure comprising pointers to each of its corresponding plurality of face-defining nodes and pointers to each of the first force functions associated with its corresponding plurality of edges; and determining that the simulated tool axis has intersected with a current contact face from among the plurality of faces and simulating cutting the object with the tool, wherein simulating cutting the object with the tool comprises:

adding a start-cut node to the mesh at a start-cut location on the current contact face;

tracking a transition location where the simulated tool axis exits the current contact face; and adding at least one transition node to the mesh at the transition location.

66. A system for simulating for simulating cutting an object with a tool, the system comprising:

an interface component for simulating operation of the tool by allowing the interface component to move in response to force applied by the user;

one or more position sensing systems coupled to the interface component for detecting movement of the interface component;

a controller configured to:
provide a tool model for simulating the tool in a simulated environment, the tool model defining the location of the tool in the simulated environment and comprising at least one simulated tool point and at least one simulated tool axis, the simulated tool point located on the simulated tool axis;

provide a mesh for simulating the object in the simulated environment, the mesh comprising: a plurality of nodes; a plurality of first force functions between pairs of nodes, each first force function being a function of a distance between its corresponding pair of nodes; and a plurality of faces, each face defined by a corresponding plurality of face-defining nodes from among the plurality of nodes in the mesh and by a corresponding plurality of edges, each edge defined between a corresponding edge-defining pair of the face-defining nodes and each edge associated with a corresponding first force function defined between the corresponding edge-defining pair of nodes;

maintain a face data structure for each face in the mesh, each face data structure comprising pointers to each of its corresponding plurality of face-defining nodes and pointers to each of the first force functions associated with its corresponding plurality of edges; and determine that the simulated tool axis has intersected with a current contact face from among the plurality of faces and simulate cutting the object with the tool, wherein simulating cutting the object with the tool comprises:
adding a start-cut node to the mesh at a start-cut location on the current contact face;
tracking a transition location where the simulated tool axis exits the current contact face; and
adding at least one transition node to the mesh at the transition location.

67. A method for simulating interaction between a tool and an object, the method comprising:
providing a tool model for simulating the tool in a simulated environment;
providing a mesh for simulating an object in the simulated environment, the mesh comprising: a plurality of nodes; a plurality of first force functions between pairs of nodes, each first force function being a function of a distance between its corresponding pair of nodes; a plurality of second force functions between pairs of nodes, each second force function being a function of a distance between its corresponding pair of nodes, wherein the first and second force functions between each particular pair of nodes are vector functions having opposite directions; and a plurality of faces, each face defined by a corresponding plurality of face-defining nodes from among the plurality of nodes in the mesh and by a corresponding plurality of edges, each edge defined between a corresponding edge-defining pair of the face-defining nodes and each edge associated with a corresponding first force function defined between the corresponding edge-defining pair of nodes;

maintaining a force function data structure for each first force function in the mesh, each force function data structure comprising: one or more parameters which define the first force function; pointers to each of the edge-defining pair of nodes between which the first force function is defined; and pointers to one face or two faces that are defined in part by the edge-defining pair of nodes between which the first force function is defined;

deforming the mesh in response to interaction between the tool model and the mesh in the simulated environment, wherein deforming the mesh comprises displacing one or more initially displaced nodes, displacement of each initially displaced node dependent on at least one first force function between the initially displaced node and at least one level-one-connected node; and determining a haptic feedback force in response to interaction between the tool model and the mesh in the simulated environment, wherein the haptic feedback force comprises the sum of one or more component feedback forces from each of the one or more initially displaced nodes, the component feedback force from each initially displaced node dependent on at least one second force function between the initially displaced node and the at least one level-one-connected node.

68. A system for simulating interaction between a tool and an object, the system comprising:
a haptic interface component for simulating operation of the tool by allowing the haptic interface component to move in response to force applied by the user;
one or more position sensing systems coupled to the haptic interface component for detecting movement of the haptic interface component;
one or more force-generating systems coupled to the haptic interface component for providing a haptic feedback force to the user via the haptic interface component;
a controller configured to:
provide a tool model for simulating the tool in a simulated environment;
provide a mesh for simulating an object in the simulated environment, the mesh comprising: a plurality of nodes; a plurality of first force functions between pairs of nodes, each first force function being a function of a distance between its corresponding pair of nodes; a plurality of second force functions between pairs of nodes, each second force function being a function of a distance between its corresponding pair of nodes, wherein the first and second force functions between each particular pair of nodes are vector functions having opposite directions; and a plurality of faces, each face defined by a corresponding plurality of face-defining nodes from among the plurality of nodes in the mesh and by a corresponding plurality of edges, each edge defined between a corresponding edge-defining pair of the face-defining nodes and each edge associated with a corresponding first force function defined between the corresponding edge-defining pair of nodes;

maintain a force function data structure for each first force function in the mesh, each force function data structure comprising: one or more parameters which define the first force function; pointers to each of the edge-defining pair of nodes between which the first force function is defined; and pointers to one face or two faces that are defined in part by the edge-defining pair of nodes between which the first force function is defined;

deform the mesh in response to interaction between the tool model and the mesh in the simulated environment, wherein deforming the mesh comprises displacing one or more initially displaced nodes, displacement of each initially displaced node dependent on at least one first force function between the initially displaced node and at least one level-one-connected node; and determine a haptic feedback force in response to interaction between the tool model and the mesh in the simulated environment, wherein the haptic feedback force comprises the sum of one or more component feedback forces from each of the one or more initially displaced nodes, the component feedback force from each initially displaced node dependent on at least one second force function between the initially displaced node and the at least one level-one-connected node.

* * * * *